US007492846B2

(12) United States Patent
Kondo

(10) Patent No.: US 7,492,846 B2

(45) Date of Patent: Feb. 17, 2009

(54) STANDARD WAVE RECEIVER AND TIME CODE DECODING METHOD

(75) Inventor: Takayuki Kondo, Hyogo (JP)

(73) Assignee: Oki Semiconductor Co., Ltd. (JP)

( * ) Notice: Subject to any disclaimer, the term of this patent is extended or adjusted under 35 U.S.C. 154(b) by 685 days.

(21) Appl. No.: 11/213,878

(22) Filed: Aug. 30, 2005

(65) Prior Publication Data

US 2006/0050824 A1 Mar. 9, 2006

(30) Foreign Application Priority Data

Aug. 31, 2004 (JP) ............................ 2004-251973

(51) Int. Cl.
*H04L 7/00* (2006.01)

(52) U.S. Cl. ...................................... 375/354; 713/500

(58) Field of Classification Search ................. 375/214, 375/242, 316, 354; 368/43, 46–47
See application file for complete search history.

(56) References Cited

U.S. PATENT DOCUMENTS 3,684,964 A * 8/1972 Bright et al. ................ 375/316
5,623,376 A * 4/1997 Ikeda et al. ................... 360/43
6,751,163 B1 * 6/2004 Miyakawa ................... 368/46
7,042,808 B2 * 5/2006 Saitoh ......................... 368/47
2005/0141600 A1 * 6/2005 Nomura et al. ............. 375/211
2006/0140282 A1 * 6/2006 Kondo ........................ 375/242

FOREIGN PATENT DOCUMENTS

JP 01-145597 6/1989
JP 06-258364 9/1994
JP 2003-215277 7/2003

OTHER PUBLICATIONS

Kenji Fujita; Japanese Office Action Relating to JP 2004-251973; Aug. 12, 2008.

* cited by examiner

*Primary Examiner*—Khanh C Tran
(74) *Attorney, Agent, or Firm*—Studebaker & Brackett PC; Donald R. Studebaker

(57) ABSTRACT

A standard wave receiver and a time code decoding method, which receive a standard wave including a time code signal, in which one frame including plural time codes is repeated, and decode the time codes, are provided. The time code signal is sampled over a period, in which a plurality of the frames continue, and sampled value sequences including plural sampled values generated in time series are accumulated. The sampled value sequences are convolutionally added every predicted period of a marker code indicating a leading position of the frame to generate an added value sequence and a position of the marker code is determined on the basis of the added value sequence. Positions of the respective plural time codes are determined in accordance with the determined position of the marker code and, for each of the time codes, partial sampled value sequences, which corresponds to a position of the time code and is expected to take an identical value, is extracted out of the sampled value sequences, the partial sampled value sequences are convolutionally added to generate an added value sequence, and a value of the time code is determined on the basis of the added value. This makes it possible to decode a time code signal precisely even under an inferior reception environment.

12 Claims, 17 Drawing Sheets

CODE STRUCTURE OF ONE FRAME (SIXTY SECONDS) OF TCO SIGNAL

| | MK | TEN-MINUTE DIGIT | | | | ONE-MINUTE DIGIT | | | | MK |
|---|---|---|---|---|---|---|---|---|---|---|
| | | 40 | 20 | 10 | 0 | 8 | 4 | 2 | 1 | |
| 0TH MINUTE | 2 | 0 | 1 | 0 | 0 | 1 | 0 | 0 | 1 | 2 |
| 1ST MINUTE | 2 | 0 | 1 | 1 | 0 | 0 | 0 | 0 | 0 | 2 |
| 2ND MINUTE | 2 | 0 | 1 | 1 | 0 | 0 | 0 | 0 | 1 | 2 |
| 3RD MINUTE | 2 | 0 | 1 | 1 | 0 | 0 | 0 | 1 | 0 | 2 |
| 4TH MINUTE | 2 | 0 | 1 | 1 | 0 | 0 | 0 | 1 | 1 | 2 |
| 5TH MINUTE | 2 | 0 | 1 | 1 | 0 | 0 | 1 | 0 | 0 | 2 |
| 6TH MINUTE | 2 | 0 | 1 | 1 | 0 | 0 | 1 | 0 | 1 | 2 |
| 7TH MINUTE | 2 | 0 | 1 | 1 | 0 | 0 | 1 | 1 | 0 | 2 |
| 8TH MINUTE | 2 | 0 | 1 | 1 | 0 | 0 | 1 | 1 | 1 | 2 |
| 9TH MINUTE | 2 | 0 | 1 | 1 | 0 | 1 | 0 | 0 | 0 | 2 |
| 10TH MINUTE | 2 | 0 | 1 | 1 | 0 | 1 | 0 | 0 | 1 | 2 |
| 11TH MINUTE | 2 | 1 | 0 | 0 | 0 | 0 | 0 | 0 | 0 | 2 |
| 12TH MINUTE | 2 | 1 | 0 | 0 | 0 | 0 | 0 | 0 | 1 | 2 |
| 13TH MINUTE | 2 | 1 | 0 | 0 | 0 | 0 | 0 | 1 | 0 | 2 |
| ⋮ | | | | | | | | | | |
| 19TH MINUTE | 2 | 1 | 0 | 0 | 0 | 1 | 0 | 0 | 0 | 2 |
| 20TH MINUTE | 2 | 1 | 0 | 0 | 0 | 1 | 0 | 0 | 1 | 2 |
| 21TH MINUTE | 2 | 1 | 0 | 1 | 0 | 0 | 0 | 0 | 0 | 2 |
| | | | | | | | | | | |
| 29TH MINUTE | 2 | 1 | 0 | 0 | 0 | 1 | 0 | 0 | 0 | 2 |
| 30TH MINUTE | 2 | 1 | 0 | 0 | 0 | 1 | 0 | 0 | 1 | 2 |
| 31TH MINUTE | 2 | 1 | 0 | 1 | 0 | 0 | 0 | 0 | 0 | 2 |
| ⋮ | | | | | | | | | | |
| 39TH MINUTE | 2 | 1 | 0 | 0 | 0 | 1 | 0 | 0 | 0 | 2 |
| 40TH MINUTE | 2 | 1 | 0 | 0 | 0 | 1 | 0 | 0 | 1 | 2 |
| 41TH MINUTE | 2 | 1 | 0 | 1 | 0 | 0 | 0 | 0 | 0 | 2 |
| ⋮ | | | | | | | | | | |
| 49TH MINUTE | 2 | 1 | 0 | 0 | 0 | 1 | 0 | 0 | 0 | 2 |
| 50TH MINUTE | 2 | 1 | 0 | 0 | 0 | 1 | 0 | 0 | 1 | 2 |
| 51TH MINUTE | 2 | 1 | 0 | 1 | 0 | 0 | 0 | 0 | 0 | 2 |
| ⋮ | | | | | | | | | | |
| 89TH MINUTE | 2 | 0 | 1 | 0 | 0 | 1 | 0 | 0 | 0 | 2 |
| 90TH MINUTE | 2 | 0 | 1 | 0 | 0 | 1 | 0 | 0 | 1 | 2 |
| 91TH MINUTE | 2 | 0 | 1 | 1 | 0 | 0 | 0 | 0 | 0 | 2 |

DECODING METHOD OF LEAST SIGNIFICANT BIT OF TEN-MINUTE DIGIT (2)

| | 0 | 1 | 2 | 3 | 4 | 5 | 6 | 7 | 8 | 9 |
|---|---|---|---|---|---|---|---|---|---|---|
| MASK PATTERN | 26 | 27 | 28 | 28 | 29 | 30 | 28 | 29 | 27 | 28 |
| BINARY 0 & 1 MATCHING DEGREE | 25 | 24 | 25 | 23 | 22 | 21 | 21 | 22 | 23 | 23 |
| BINARY 1 & 0 MATCHING DEGREE | 23 | 25 | 26 | 26 | 28 | 29 | 27 | 28 | 26 | 27 |
| MATCHING DEGREE DIFFERENCE | 2 | 1 | 1 | 3 | 6 | 8 | 6 | 6 | 3 | 4 |

STANDARD WAVE RECEIVER AND TIME CODE DECODING METHOD

BACKGROUND OF THE INVENTION

1. Field of the Invention

The present invention relates to a standard wave receiver that receives a standard wave and presents clock time, and a time code decoding method of decoding a time code signal superimposed on the standard wave.

A standard wave providing the Japanese Standard Time is always transmitted by long waves of 40 kHz and 60 kHz from two locations in Japan, the Kyushu Long Wave Station and the Fukushima Long Wave Station that are operated and managed by the Communication Research Laboratory. A carrier wave of such a standard wave is subjected to amplitude modulation according to a time code signal (hereinafter also referred to as TCO signal) that is generated at a bit rate of 1 bit/second. In the time code signal, one frame consisting of 60 bits is repeated every one minute. Time information including year, month, day, hour and minute is stored in each frame in a notation form of a Binary Coded Decimal code (BCD) (see FIG. 1).

A code of one bit forming the time code signal is any one of three codes, namely, a binary “1”. code indicating binary “1”, a binary “0” code indicating binary “0”, and a marker code (for convenience, indicated by “2” or “M”) that is a synchronizing signal for indicating a partition of time information. In that sense, it should be noted that the term “bit” used in this specification is different from a usual example of the term. The three codes are distinguished according to a difference of an H width in a square pulse (see FIG. 2).

It is well known that, in actual reception of such a standard wave, a problem occurs in precise decoding of the time code signal. For example, a noise signal is superimposed on a received wave because of sferics noise or noise caused by automobiles or apparatuses such as home appliances. In such cases, a starting point of a rising edge of a square pulse of the time code signal cannot be detected precisely. Thus, bit synchronization is inaccurate. Under a reception environment with a low field intensity, a square pulse is distorted to make it difficult to decode a code precisely.

2. Description of the Related Art

A technique disclosed in JP-A-2003-215277 makes it possible to overcome such a problem by additional processing for sampling an integral value of a time code signal pulse, which is generated from a standard wave, every predetermined time to distinguish a code.

However, a basic approach of such a method simply realizes precise decoding of respective square pulses by calculating an integral value of one pulse waveform. Therefore, under a reception environment with extremely inferior noise intensity, field intensity, or the like, even decoding of a waveform cannot be performed, to say nothing of the presence or absence of a decoding error.

OBJECTS AND SUMMARY OF THE INVENTION

It is an object of the invention to provide a standard wave receiver and a time code decoding method that make it possible to perform precise decoding of a time code signal even under an inferior reception environment.

A standard wave receiver forming one characteristic of the invention is a standard wave receiver that receives a standard wave including a time code signal, in which one frame including plural time codes is repeated, and decodes the time codes, the standard wave receiver including: a sampled value sequence accumulating unit that samples the time code signal over a period in which a plurality of the frames continue and accumulates sampled value sequences including plural sampled values generated in time series; a marker position determining unit that convolutionally adds the sampled value sequences every predicted period of a marker code indicating a leading position of the frame to generate an added value sequence and determines a position of the marker code on the basis of the added value sequence; a time code position determining unit that determines positions of the respective plural time codes in accordance with the determined position of the marker code; and a time code determining unit that, for each of the time codes, extracts partial sampled value sequences, which corresponds to a position of the time code and is expected to take an identical value, out of the sampled value sequences, convolutionally adds the partial sampled value sequences to generate an added value sequence, and determines a value of the time code on the basis of the added value.

A time code decoding method forming another characteristic of the invention is a time code decoding method of decoding a time code signal, in which one frame including plural time codes is repeated, from a standard wave, the time code decoding method including: a sampled value sequence accumulating step of sampling the time code signal over a period in which a plurality of the frames continue and accumulating sampled value sequences including plural sampled values generated in time series; a marker position determining step of convolutionally adding the sampled value sequences every predicted period of a marker code indicating a leading position of the frame to generate an added value sequence and determines a position of the marker code on the basis of the added value sequence; a time code position determining step of determining positions of the respective plural time codes in accordance with the determined position of the marker code; and a time code determining step of, for each of the time codes, extracting partial sampled value sequences, which corresponds to a position of the time code and is expected to take an identical value, out of the sampled value sequences, convolutionally adding the partial sampled value sequences to generate an added value sequence, and determining a value of the time code on the basis of the added value.

A time code decoding method forming still another characteristic of the invention is a time code decoding method of decoding a time code signal, in which one frame including plural time codes is repeated, from a standard wave, the time code decoding method including: a sampling step of sampling the time code signal to generate sampled value sequences including plural sampled values formed in time series; a bit synchronizing step of convolutionally adding the sampled value sequences at each predetermined time to generate an added value sequence and defining a bit synchronization point of the sampled value sequences on the basis of the added value sequence; a position marker synchronizing step of convolutionally adding the sampled value sequences every predicted period of emergence of a position marker code to generate an added value sequence and defining a position marker synchronization point of the sampled value sequences on the basis of the bit synchronization point and the added value sequence; and a frame synchronizing step of convolutionally adding the sampled value sequences every predicted period of emergence of a marker code indicating a leading position of the frame to generate an added value sequence and defining a frame synchronization point of the sampled value sequences on the basis of the position marker synchronization point and the added value sequence.

DETAILED DESCRIPTION OF THE PREFERRED EMBODIMENTS

Embodiments of the invention will be explained in detail with reference to the accompanying drawings.

Figure 1:
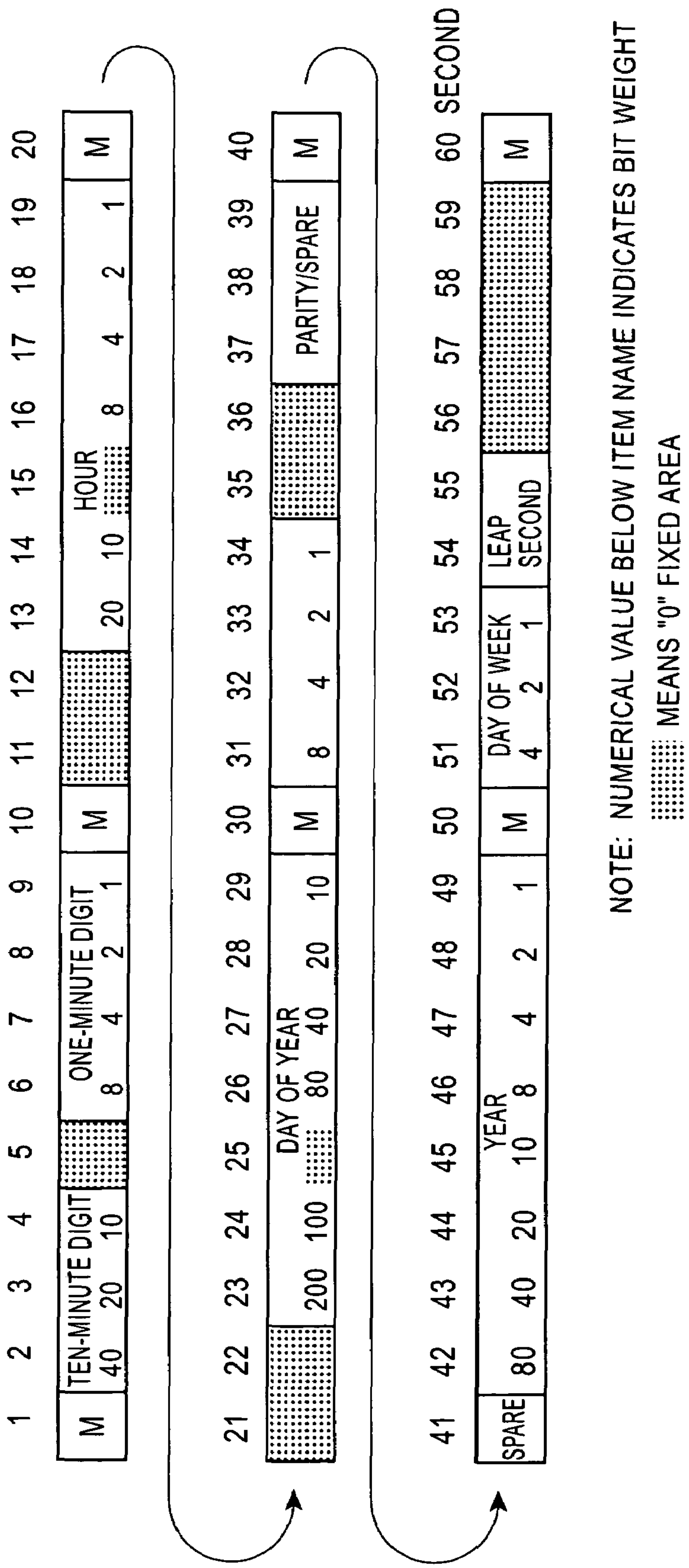
FIG. 1 is a diagram illustrating details of time codes included in a time code signal of a standard wave.
Figure 2:
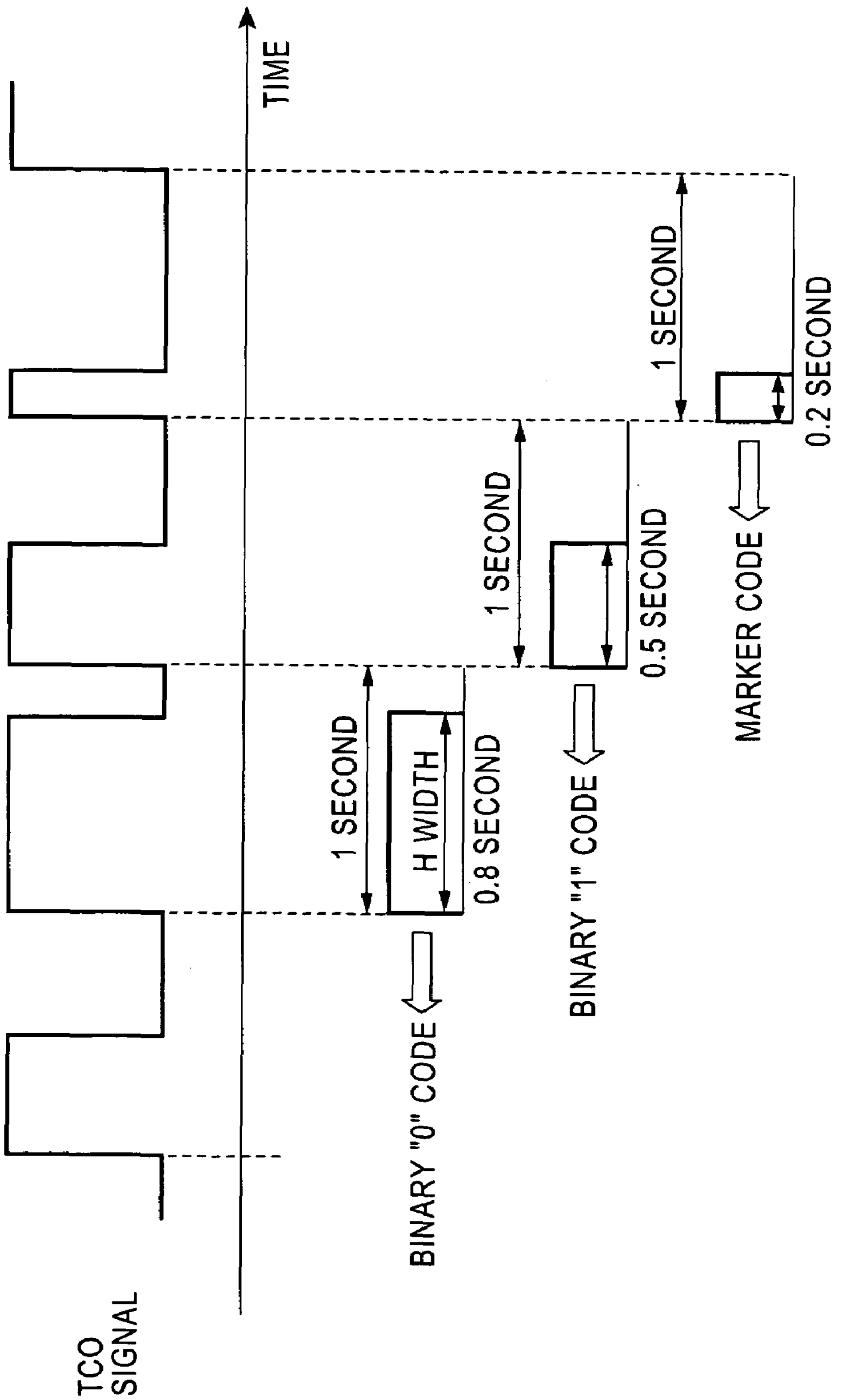
FIG. 2 is a diagram illustrating a pulse sequence forming a time code signal of a standard wave.
Figure 3:
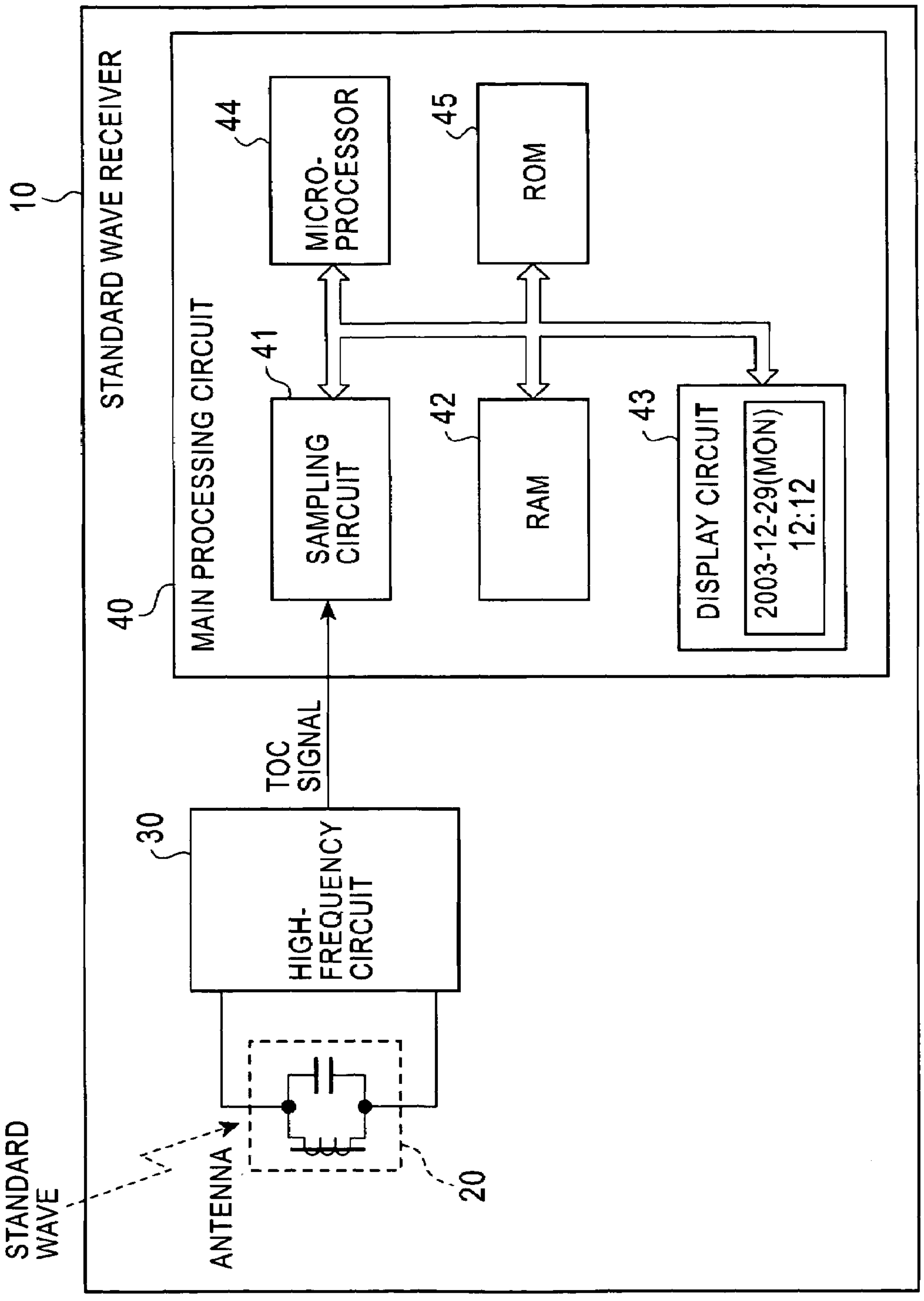
FIG. 3 is a block diagram showing a structure of a standard wave receiver in a first embodiment of the invention.

FIG. 3 shows a structure of a standard wave receiver in a first embodiment of the invention. The standard wave receiver executes a time code decoding method according to the invention. Referring to the figure, a standard wave receiver 10 includes an antenna 20, a high-frequency circuit 30, and a main processing circuit 40. The main processing circuit 40 includes a sampling circuit 41, a RAM 42, a display circuit 43, a microprocessor 44, and a ROM 45. The standard wave receiver 10 could be, for example, a device such as a radio controlled watch (clock) that calibrates displayed time on the basis of time data of a standard wave.

The antenna 20 is a receiving antenna for long waves, such as a bar antenna. The antenna 20 receives a standard wave and supplies the standard wave to the high-frequency circuit 30. The high-frequency circuit 30 amplifies and detects such a received wave, extracts a time code signal (hereinafter referred to as TCO signal) carried on the standard wave, and supplies the TOC signal to the main processing circuit 40. The main processing circuit 40 is a section that subjects the TCO signal to digital information processing. The main processing circuit 40 includes the sampling circuit 41 that samples the TCO signal, which is an analog signal, at a sampling rate of, for example, 50 ms. The sampling circuit outputs sampling data, which is a digital signal, to the RAM 42 that accumulates the sampling data and also accumulates a result of an arithmetic operation applied to the sampling data. The circuit 40 also includes the microprocessor 43 that calculates bit decoding and frame decoding with respect to the sampling data and restores time data such as year, month, day, hour and minute included in the TCO signal. The circuit 40 also includes the ROM 45 that stores arithmetic operation programs for the bit decoding, the frame decoding, and the like. The circuit 40 also includes the display circuit 43 that displays the restored time information using a display element such as an LED or a liquid crystal display. These respective sections are connected by a common bus.

Figure 4:
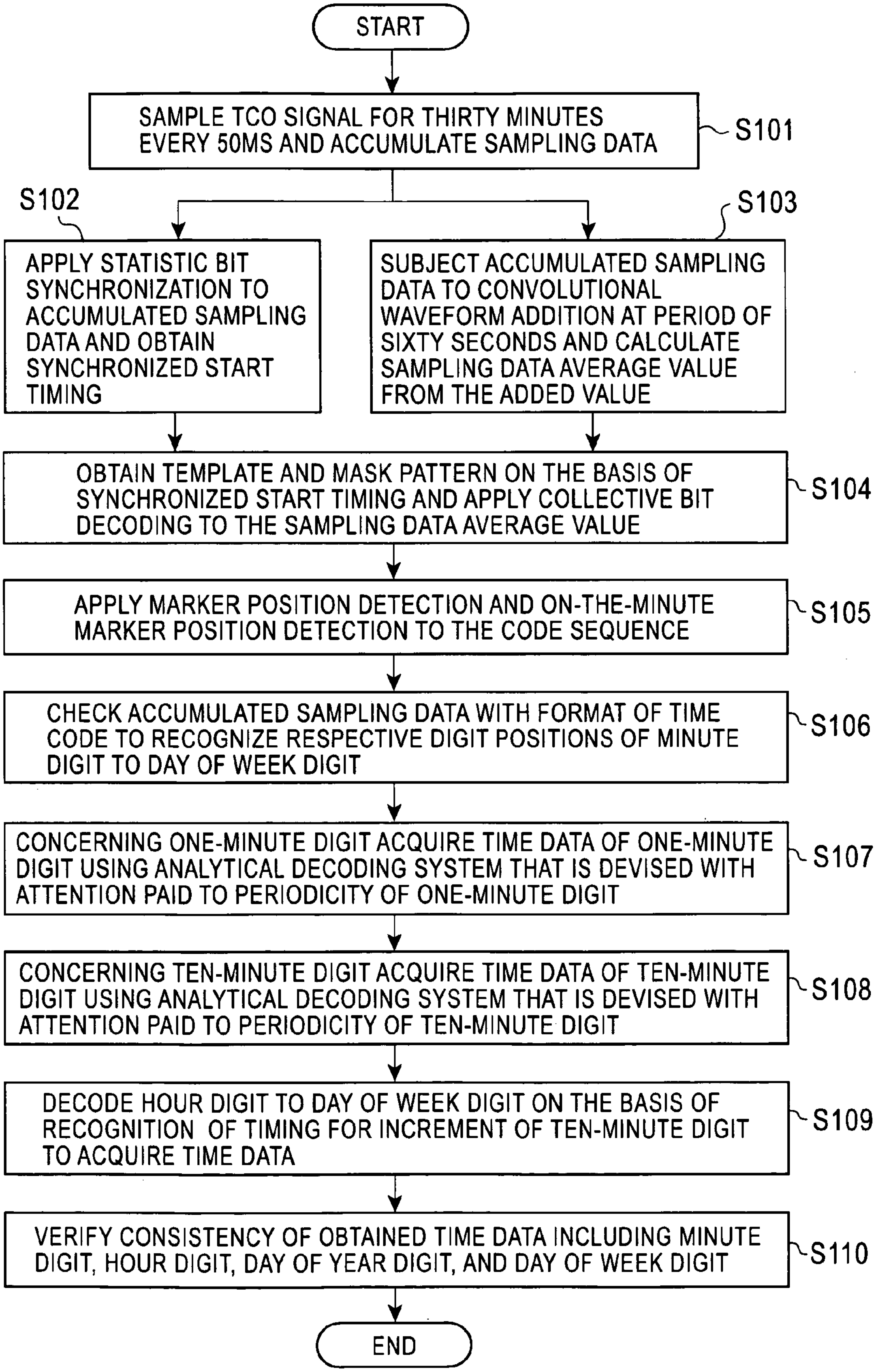
FIG. 4 is a flowchart showing a processing procedure that is executed in the standard wave receiver in the first embodiment.

FIG. 4 shows a processing procedure that is executed in the standard wave receiver 10 shown in FIG. 3. The processing procedure will be explained with reference to the components shown in FIG. 3 as necessary. As a premise, the standard wave receiver 10 starts sampling of a time code signal, which is supplied from the high-frequency circuit 30, with a predetermined start position as a reference. For example, this starting point may be calculated from a rising edge of a standard wave received first or may be calculated using a special call sign or the like, which is included in the standard wave, as a synchronizing signal.

First, the standard wave receiver 10 samples, for example, a TCO signal for thirty minutes every 50 ms and accumulates a sampled value sequence of a plurality of sampled values forming a time series, that is, sampling data (step S101).

Next, the standard wave receiver 10 applies statistic bit synchronization to the accumulated sampling data to obtain synchronization start timing (step S102). The statistic bit synchronization is a system for setting a rising edge which uniformly changes from a minimum to a maximum as a synchronization starting point in a graph which is obtained by sampling a waveform of a TCO signal at a predetermined sampling rate such as 50 ms in this embodiment, and subjecting the waveform to convolutional waveform addition a plurality of times (for example, 5 times) at a one second period coinciding with a bit rate of the TCO signal.

On the other hand, before or after the bit synchronization or in parallel with the bit synchronization, the standard wave receiver 10 subjects the accumulated sampling data to the convolutional waveform addition at a period of 60 seconds to acquire an added value sequence and calculates a sampling data average value from the added value sequence (step S103). The sampling data average value is the sampling data in which a part fluctuating according to time shift in thirty minutes is eliminated and a noise component is reduced.

Next, the standard wave receiver 10 calculates a template and a mask pattern on the basis of synchronization start timing and applies collective bit decoding to the sampling data average value (step S104). Consequently, a code sequence for thirty minutes, in which decoding of codes is performed, is obtained. Details of the collective bit decoding will be described later.

Next, the standard wave receiver 10 performs position marker position detection and an on-the-minute marker position detection with respect to the code sequence (step S105). The position marker position detection and the on-the-minute marker position detection are executed using systems for statistic marker position detection and statistic on-the-minute marker position detection. Such systems will be explained in detail in a third embodiment. Subsequently, the standard wave receiver 10 checks the accumulated sampling data with a format of time codes to recognize digit positions of the respective time codes including a one-minute digit code, a ten-minute digit code, an hour digit code, a day of year digit code, a year digit code, and a day of week digit code (step S106).

Next, concerning a one-minute digit with a largest change, the standard wave receiver 10 uses an analytical decoding system, which is devised focusing on the periodicity of the one-minute digit, to acquire time data of the one-minute digit (step S107). The analytical decoding system for the one-minute digit is a system that takes into account a characteristic that the one-minute digit cycles in ten minutes. In the analytical decoding system, time data of the minute digit is decoded on the basis of sampling data, which is partial sampled value sequences extracted every ten minutes out of the sampling data accumulated in step S104, and positional information of the one-minute digit obtained in step S106.

Next, concerning a ten-minute digit with a second largest change next to the one-minute digit, the standard wave receiver 10 uses an analytical decoding method, which is devised by paying attention to the periodicity of the ten-minute digit, to acquire time data of the ten-minute digit (step S108). The analytical decoding system for the ten-minute digit takes into account a characteristic that ten data from the 0 minute to the 9 minute time do not change after completion of decoding a one-minute digit or a characteristic that a least significant bit of the ten-minute digit changes alternately between values 0 and 1 every ten minutes. In the analytical decoding system, time data of the ten-minute digit is decoded on the basis of sampling data for twenty minutes extracted out of the sampling data accumulated in step S101 and positional information of the ten-minute digit obtained in step S106 (see FIGS. 8 and 9A to 9D).

Next, the standard wave receiver 10 performs decoding of digits from the hour digit to the day of week digit on the basis of recognition of changing timing of the ten-minute digit, that is, increment timing thereof to acquire time data (step S109). This makes use of a characteristic that there is no change in time codes concerning the hour digit, the day of year digit, and the day of week digit for ten minutes after the increment of the ten-minute digit.

Next, the standard wave receiver 10 verifies consistency of the obtained time data including the minute digit, the hour digit, the day of year digit, and the day of week digit (step S110). As the verification of consistency, processing for checking compatibility with a format, presence of year, month, and day, and the like to regard nonacceptable data as an error is performed. Obtained standard time information is provided for a function such as display or time setting.

As it is evident in the processing procedures described above, one characteristic of the invention is that, unlike an approach for decoding respective codes forming a time code signal on a real time basis, sampling data of time code signals over a certain time period are collected and subjected to collective statistic processing to realize precise decoding. There is difficulty in that, naturally, the time information over the time period is updated on a real time basis and a value thereof fluctuates. However, in this characteristic, such difficulty is avoided by, taking into account periodicity or continuity in that respective codes of time codes take an identical value, extracting sampling data, which are expected to take an identical value, and subjecting to statistic processing.

Figure 5:
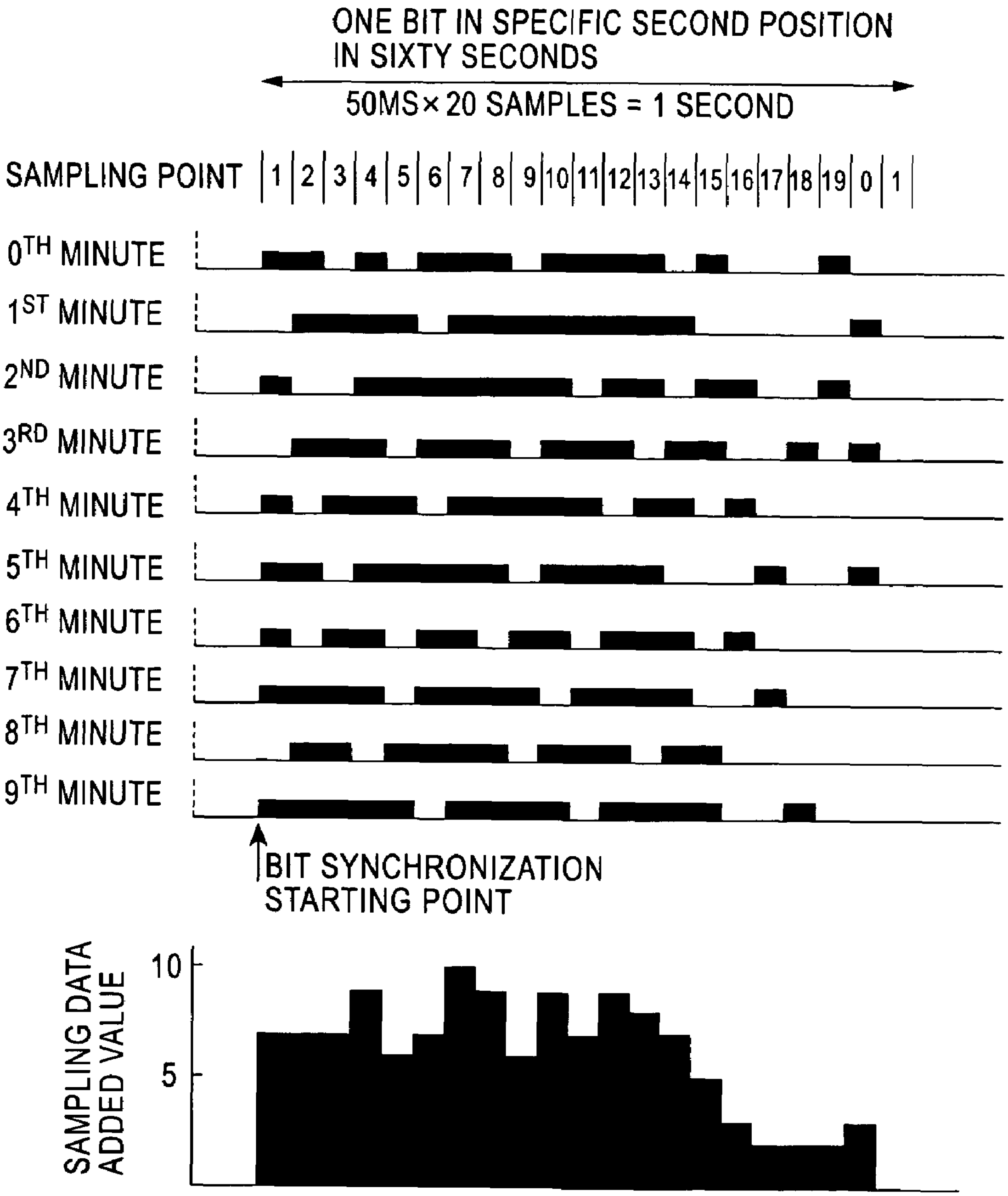
FIG. 5 is a diagram illustrating a collective decoding method in the first embodiment.
Figure 6:
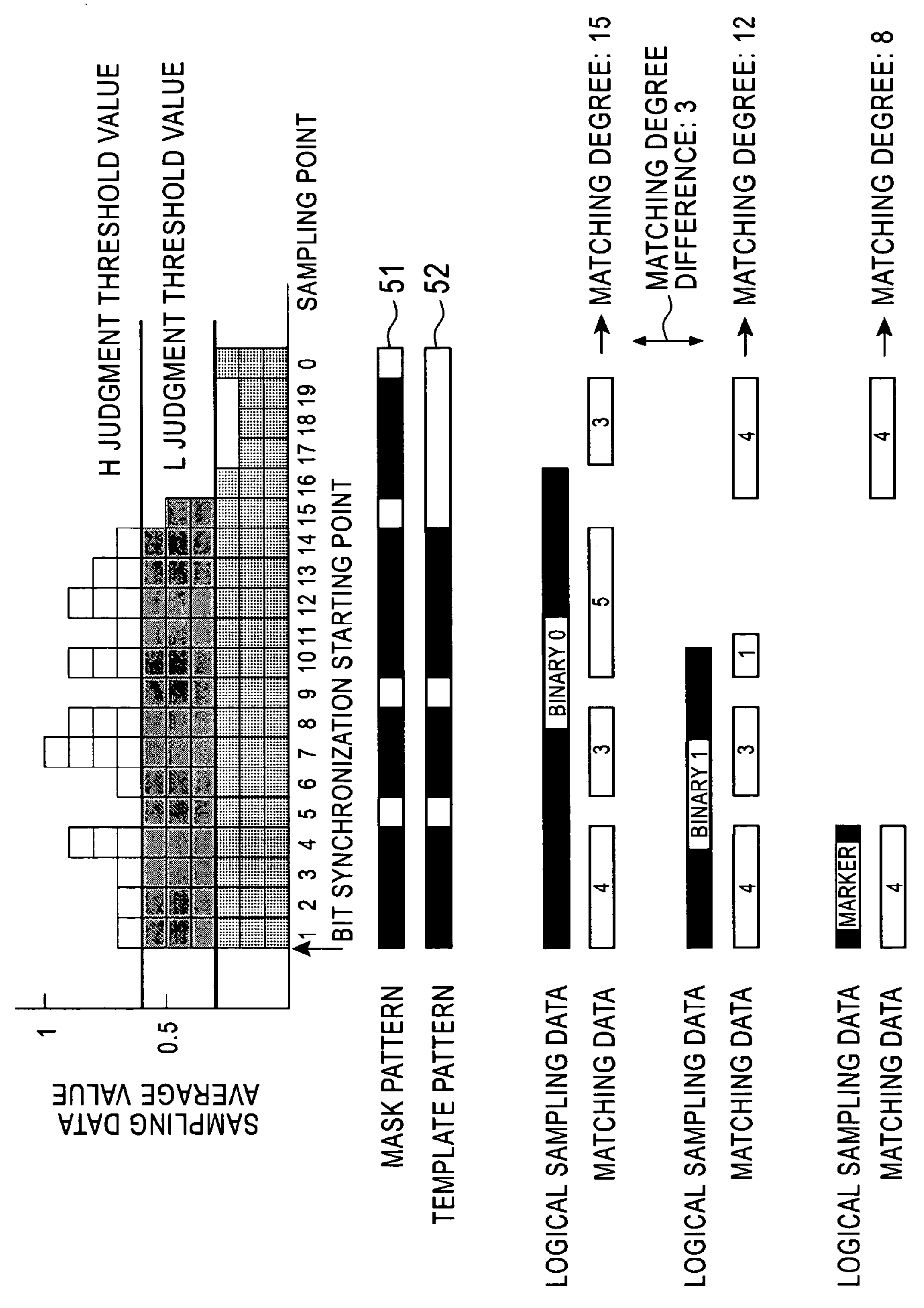
FIG. 6 is a diagram further illustrating the collective decoding method in the first embodiment.

FIGS. 5 and 6 illustrate a collective decoding method in the first embodiment. Here, collective bit decoding is applied to sampling data for which bit synchronization is obtained to obtain frame synchronization for sampling data equivalent to plural frames.

FIG. 5 shows a change in ten minutes of one bit in a specific second position in sixty seconds that is obtained as a result of superimposing accumulated sampling data for ten minutes at a period of sixty seconds. Bit synchronization is realized using a bit synchronization point extracted by statistic bit synchronization. A sampling data added value as shown in a graph in lower part of the figure is obtained by convolutionally adding these sampling data in a vertical direction. An added value of the sampling data is an analog value from 0 to an added number.

FIG. 6 shows a graph of a sampling data average value obtained by calculating an average value in ten minutes for sampling data added values. An H judgment threshold value and an L judgment threshold value are set for the sampling data average value. In this example, the H judgment threshold value is set to 70% (=0.7) or more of the added number and the L judgment threshold value is set to 30% (=0.3) or more of the added number.

A mask pattern 51 and a template pattern 52 are obtained by applying these threshold values. The mask pattern 51 is created by setting points, at which the sampling data average value is in a range between both the threshold values, to 0 and setting the other points to 1. The template pattern 52 is created by setting points, at which the sampling data average value is equal to or higher than the H judgment threshold value, to 1 and setting the other points to 0. The mask pattern is used for excluding parts, for which judgment on H and L is difficult, among sampling data, from evaluation of a matching degree.

A logical product of data, which is obtained by applying the mask pattern 51 and the template pattern 52 to the sampling data average value, and logical sampling data (binary 0, binary 1, or marker) serving as reference data is calculated for each row. This logical product is set as matching data. Matching in this context means determining whether a code is a binary 0 code, a binary 1 code, or a marker code by evaluating a correlation value, that is, a matching degree between two data that are objects of comparison. Here, the matching degree is calculated by counting a length of matching data, that is, compatible bits of the sampling data and the logical sampling data. A code (binary 0, binary 1, or marker) providing a maximum matching degree is set as a bit decode value. In the example shown in the figure, a "binary 0" code providing a maximum matching degree '15' is decoded.

It is possible to recognize a beginning of a frame by performing marker detection and position detection for an on-the-minute marker using the collective bit decoding described above. Consequently, in sampling data accumulated for, for example, thirty minutes, regardless of a deteriorated waveform state of the sampling data, it is possible to precisely recognize digit positions of time codes in a time code format, that is, respective digit positions of the minute digit, the hour digit, the day of year digit, and the day of week digit. Note that the example of position detection for a marker, for which a code does not change in ten minutes of a sampling period, has been explained. However, when a code changes as in the minute digit, since fluctuation increases and a median value of added values increases, a matching area of mask patterns decreases. As a result, a matching degree decreases and it is difficult to decode a time code itself such as a minute digit code, an hour digit code, a day of year code, or a day of week code.

Figure 7:
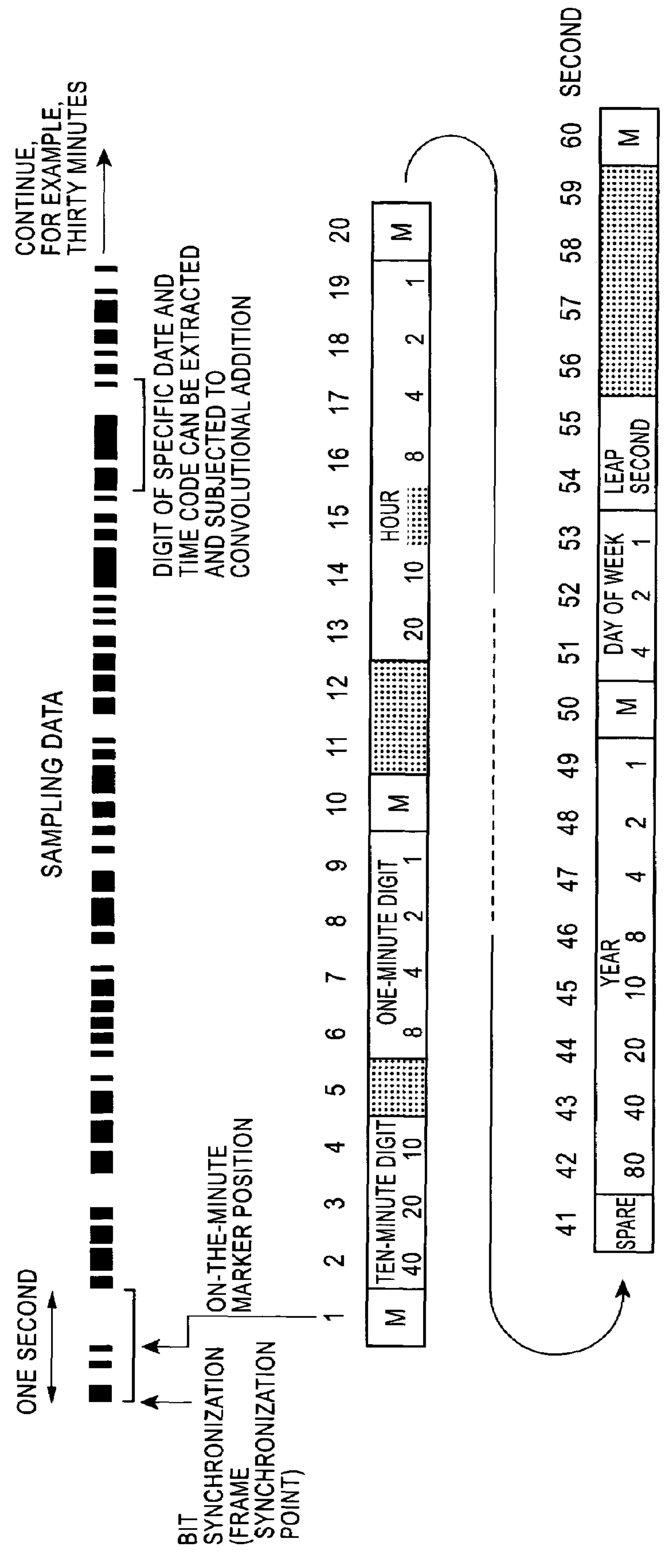
FIG. 7 is a diagram illustrating a method of determining positional digits of time codes in a frame in the first embodiment.

FIG. 7 illustrates a method of determining a position digit of a time code in a frame in the first embodiment. As shown in the figure, sampling data is captured by sampling time code signals twenty times in one second, in which a change in H/L values thereof is 1/0 every 50 ms. As shown in the figure, periods, in which an H value of the time code signals is detected continuously, are represented by shading. As a result of the statistic bit synchronization and the statistic on-the-minute marker position determination in the first embodiment, bit synchronization and frame synchronization are applied to sampling data formed in time series. As a result, as shown in the figure, it is possible to decide a correspondence relation among respective second positions of the sampling data formed in time series, the time code signals, and digit positions of the respective time codes.

Figure 8:
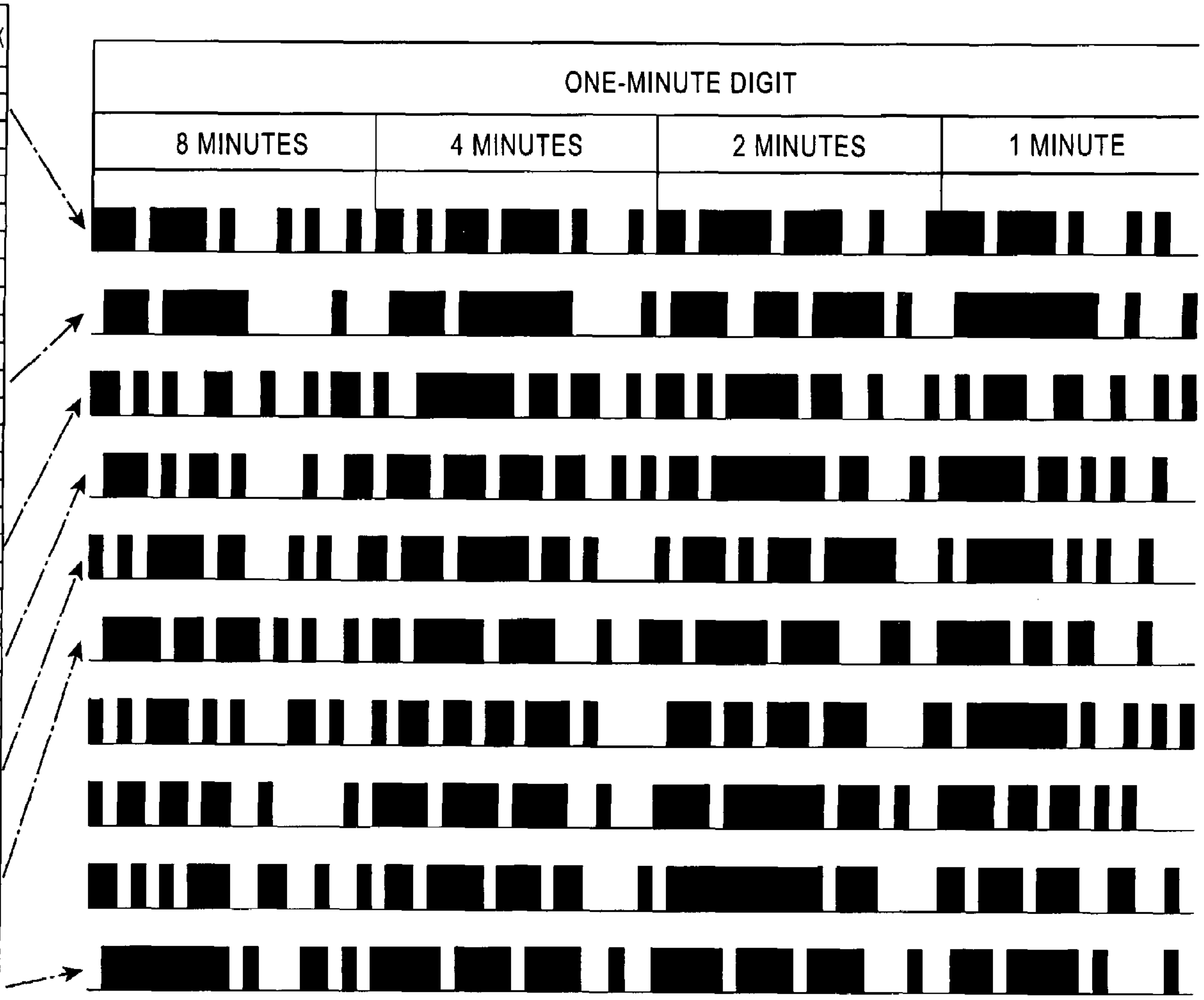
FIG. 8 is a diagram illustrating a decoding method for a one-minute digit code in the first embodiment.

FIG. 8 illustrates a decoding method for a one-minute digit code in the first embodiment. In decoding the one-minute digit code, since a one-minute digit is incremented every one minute, it is impossible to use a method of calculating a convolutional added value continuously every minute cannot be used to improve an SN ratio as in the other digits. Thus, it is possible to use a method of improving an SN ratio according to convolutional addition using a characteristic that same data of the one-minute digit appears at a period of ten minutes.

First, in the decoding of the one-minute digit, as illustrated in FIG. 7, since a position of the one-minute digit has been determined, only sampling data corresponding to minute digits are acquired out of accumulated sampling data. Then, taking into account a characteristic that the one-minute digit circulates once in ten minutes, only sampling data of the one-minute digit for every ten minutes is extracted from the sampling data corresponding to the minute digits. Referring to the figure, minute digit data at 0th, 10th, 20th, 30th, 40th, 50th, 60th, 70th, 80th, and 90th minutes is "9" (1001B) in minute digits of time codes. Thus, it is possible to acquire only sampling data corresponding to the minute digits and arrange the sampling data as 4 bit sampling data. The four bits of the minute digits are decoded by applying the same added value and the same bit decoding method as explained in the collective bit decoding (see FIGS. 5 and 6) to the sampling data. The decoding method for minute digits is shifted at every minute to be sequentially applied to the minute digits, whereby data of 0 to 9 minutes are decoded and all data of the minute digits are calculated.

FIGS. 9A to 9D illustrate the decoding method for a ten-minute digit code in the first embodiment. Here, the figures illustrate a state in which time data of a ten-minute digit is decoded with respect to sampling data, in which digit positions have been recognized, on the basis of decoding of time data of a one-minute digit.

The ten-minute digit has a characteristic that it does not change for ten minutes. Decoding of the ten-minute digit is performed taking this characteristic into account. As a first approach to a decoding method for the ten-minute digit, there is a method of completing decoding of the one-minute digit and decoding the ten-minute digit using a characteristic that ten data of 0 to 9 minutes do not change. As a second approach, there is a method of detecting a change in every ten minutes and decoding the ten-minute digit using a characteristic that a least significant bit of the ten-minute digit changes between 0 and 1 in ten minutes. The first method is a reliable method but has a disadvantage that the decoding of the one-minute digit requires a sampling time ten times as long as a sampling time for the other digits in order to obtain a sufficient SN ratio according to addition processing because one data is added at every ten minutes. The second method will be explained in this embodiment.

Figure 9A:
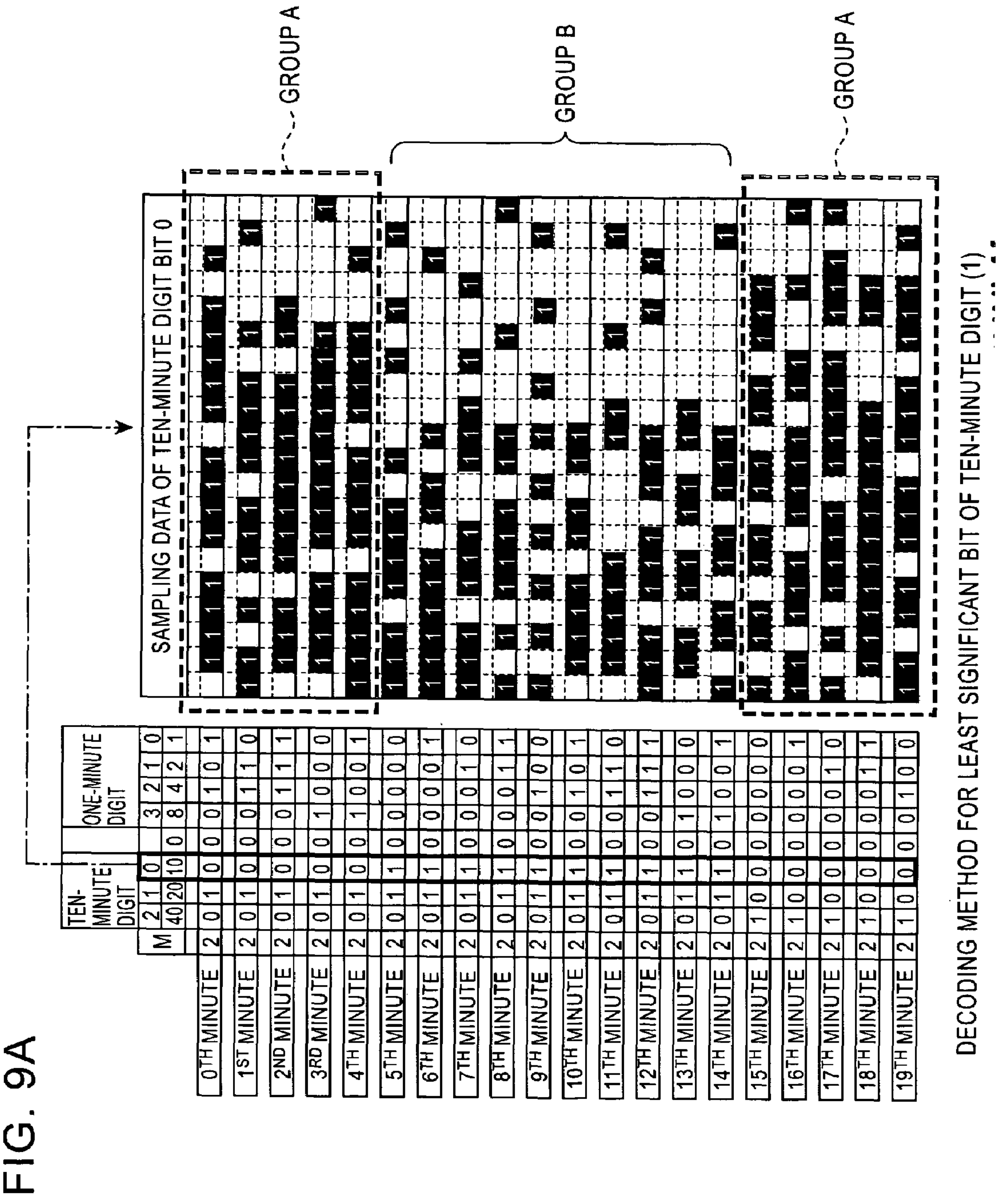
FIG. 9A is a diagram illustrating a decoding method for a ten-minute digit code in the first embodiment.

Referring to FIG. 9A, contents of a least significant bit of a ten-minute digit of sampling data sampled for twenty minutes and time codes corresponding to the sampling data are shown. It is impossible to determine the codes of the contents of the sampling data simply by looking at the data. As indicated by black frames, contents of the corresponding time codes are assumed to be binary 0 from 0th to 4th minutes, binary 1 from 5th to 14th minutes, and binary 1 from 15th to 19th minutes. The least significant bit of the ten-minute digit has a characteristic that codes are reversed alternately every ten minutes. For example, the least significant bit of the ten-minute digit is binary 0 at ten minutes of each even number such as 0, 20, and 40 minutes and binary 1 in ten minutes of each odd number such as 10, 30, and 50 minutes. The invention pays attention to such a point. In the invention, sampling data with a ten-minute digit bit 0 are divided into continuous ten data in an A group and the remaining ten data in a B group. Bit decoding according to convolutional addition is performed in the respective groups. This grouping is performed for each one minute with offset (i.e., a boundary shift), a grouping with a most satisfactory characteristic is selected, and it is determined whether the least significant bit of the ten-minute digit is binary 0 or binary 1.

Figure 9B:
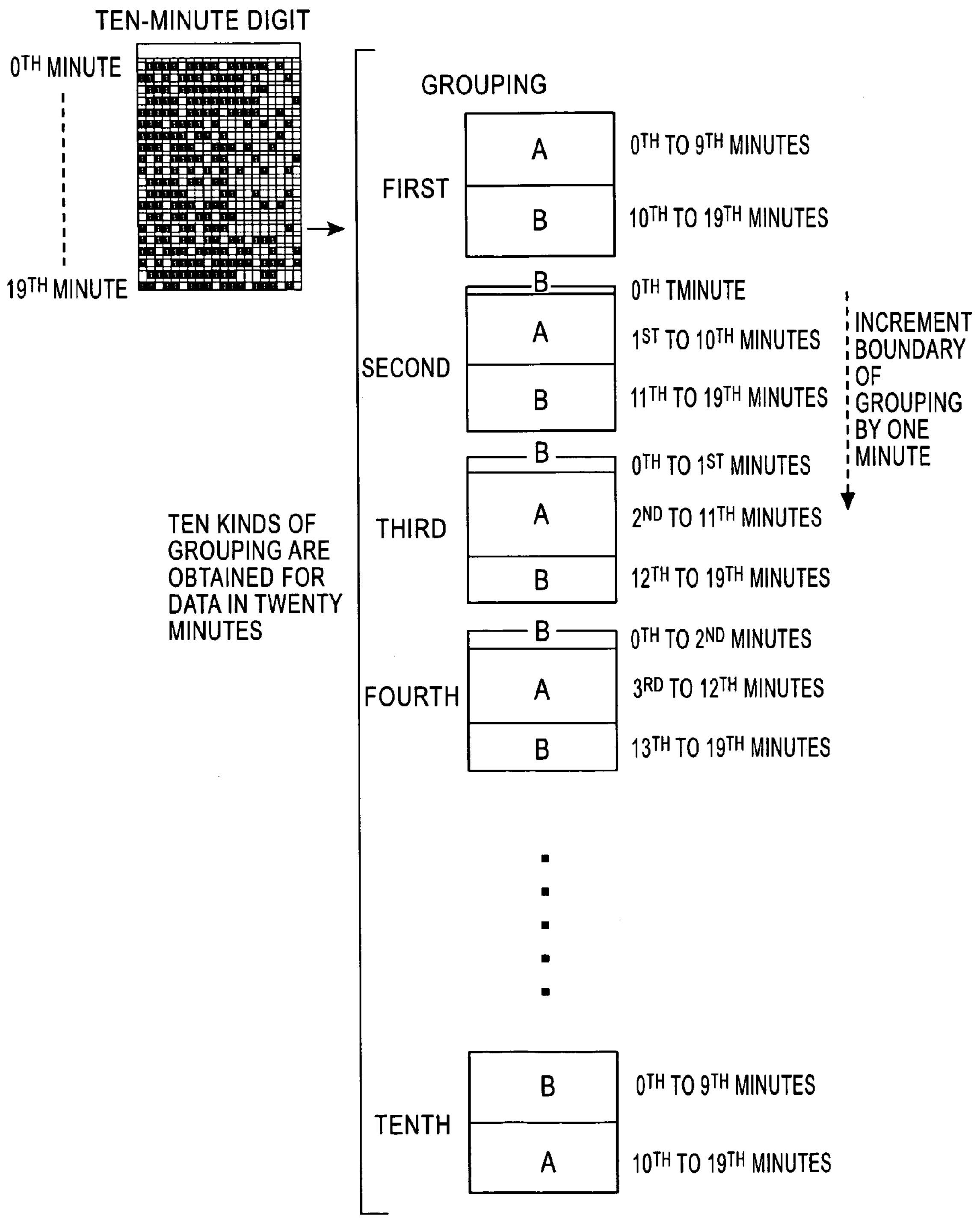
FIG. 9B is a diagram further explaining the decoding method for a ten-minute digit code in the first embodiment.

Referring to FIG. 9B, a specific method of the grouping is shown. In first grouping, 0th to 9th minutes are set to the A group and 10th to 19th minutes are set to the B group. In second grouping, 0th minute is set to the B group, 1st to 10th minutes are set to the A group, and 11th to 19th minutes are set to the B group with offset of one minute. Thereafter, grouping is performed in the same manner, whereby ten groupings, namely, first to tenth groupings are completed. Grouping with a most satisfactory characteristic is selected out of the ten groupings to determine whether data of a ten-minute digit bit 0 is binary 0 or binary 1.

Figure 9C:
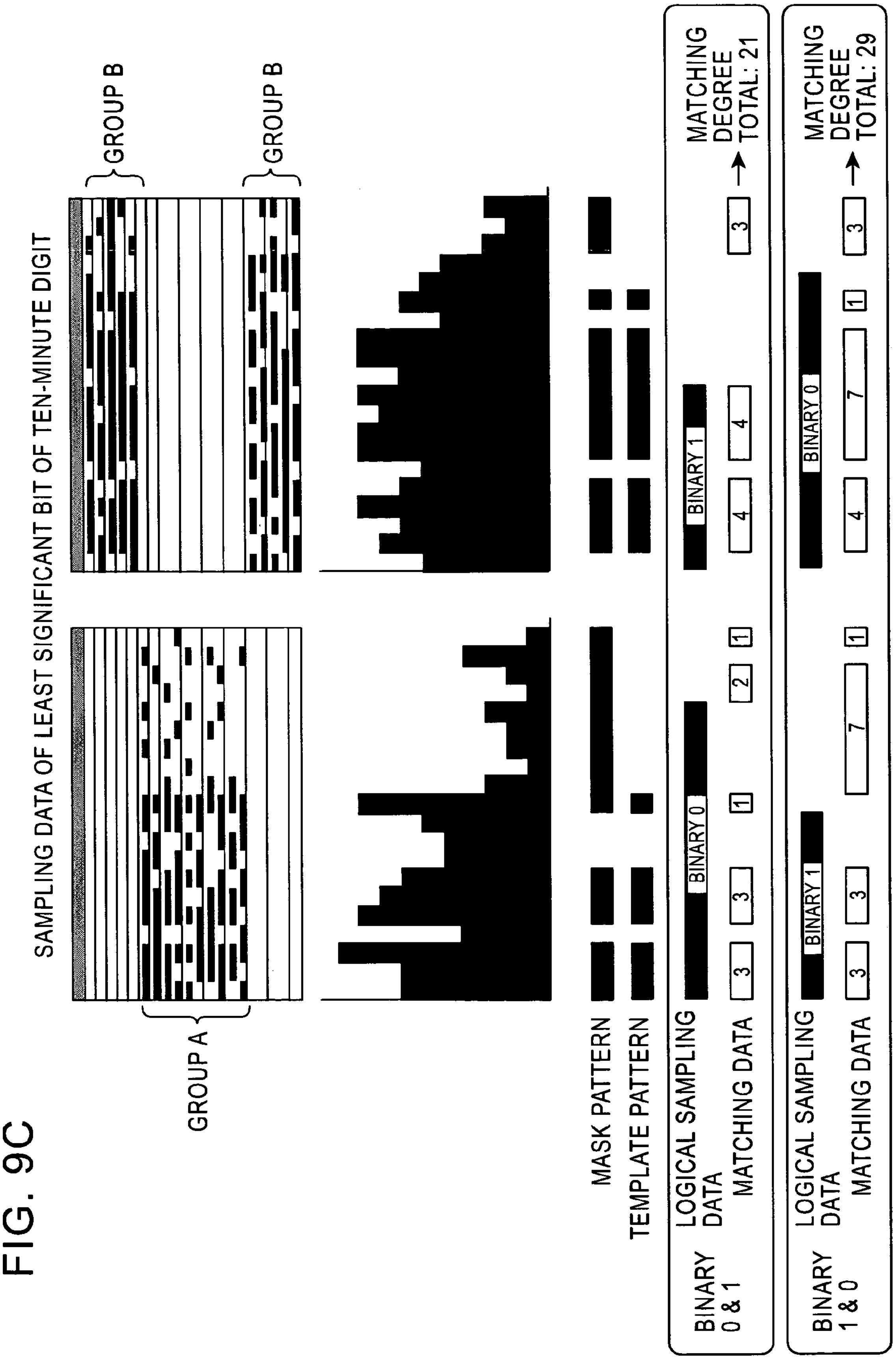
FIG. 9C is a diagram further explaining the decoding method for a ten-minute digit code in the first embodiment.

Referring to FIG. 9C, a method of calculating a matching degree using the collective bit decoding is shown for one grouping. Concerning the group A and the group B of one grouping, convolutional addition and a bit decoding method are applied according to the same method in the collective bit decoding. The group A and the group B should be formed of opposite binaries 0 and 1, respectively. Thus, matching data and matching degrees of logical sampling data for two kinds of combinations, namely, a combination of binary 0 and binary 1 and an opposite combination of binary 1 and binary 0. In addition, totals of the matching degrees are calculated in order to obtain total values of the respective combinations. A difference between the totals of the matching degrees is larger as compatibility is higher because the combinations are opposite to each other. In other words, a difference between both the totals of the matching degrees is larger as compatibility is higher. Therefore, a matching degree difference is defined as follows: matching degree difference=|matching degree total of combination 0&1−matching degree total of combination 1&0|.

The grouping in the example shown in the figure is grouping in the case in which an offset amount is 5. In this case, a total of matching degrees is "21" in the case of the combination of binary 0 and binary 1. In the opposite combination of binary 1 and binary 0, a total of matching degrees is "29". 8 is given as a matching degree difference.

Figure 9D:
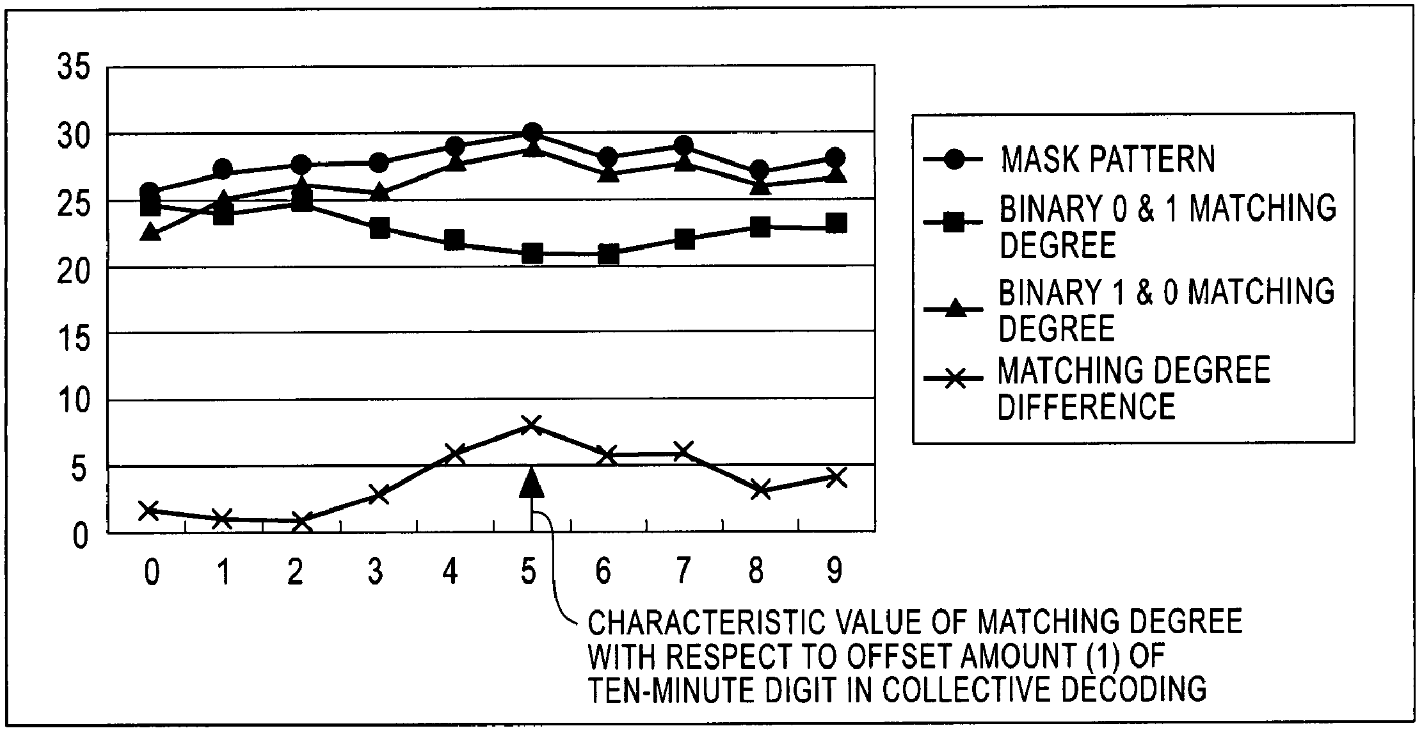
FIG. 9D is a graph showing a change in a matching degree with respect offset in decoding of a ten-minute digit code in the first embodiment.

Referring to FIG. 9D, changes in totals of matching degrees and a matching degree difference with respect to the respective groupings shown in FIG. 9B are shown. As apparent from a graph in FIG. 9D, the matching difference value is the highest at an offset amount of 5. In other words, it is determined that a boundary, which is offset by five minutes from a first starting point with a boundary of grouping set in the middle of twenty minutes, is a most suitable boundary. Such a result coincides with original contents of sampling data and time codes (see FIG. 9A).

It is possible to acquire changing timing for the ten-minute digit by analyzing the sampling data of the ten-minute digit bit 0 according to the procedure described above. It is also possible to acquire minute digits without analyzing the minute digits by incrementing the one-minute digit every one minute with minute digit data set to 0 at this changing timing. It is also possible to acquire a second digit and a third digit (a least significant bit is set to a first digit) of the ten-minute digit by bit-decoding the sampling data for ten minutes in which the least significant bit of the ten-minute digit does not change. Note that, although sampling timing is set to twenty minutes in this embodiment, the same procedure is also applicable when sampling timing is other than twenty minutes.

As a modification of a method of changing offset at intervals of one minute, changing offset at intervals of two minutes is also possible. Possibility of changing offset at intervals of two minutes will be explained below. When the least significant bit of the one-minute digit is analyzed, it is seen that, first, "0/1 of the least significant bit of the one-minute digit represents an even number/an odd number of minute digits" and, second, "carrying of the one-minute digit occurs from x9 minutes to x0 minute, that is, at timing when the least significant bit of the one-minute digit changes from an odd number to an even number." Thus, it is seen that a boundary of grouping in the analysis of the least significant bit of the ten-minute digit only has to be implemented by selecting the minutes whose least significant bit of the one-minute digit is 0. The changing offset at intervals of one minute is effective as a method of detecting timing of change of ten minutes. However, the form has a disadvantage in that it is difficult to determine the timing when there is no clear peak of a sum of matching degrees because offset is changed at intervals of one minute in an analyzing step. On the other hand, the method of changing offset at intervals of two minutes has an advantage in that it is possible to detect a clear peak of a total of offset values because intervals of offset are set to two minutes by analyzing a bit 0 of the one-minute digit. Easiness in determination of a peak of a difference between sums of matching degrees means that it is possible to determine the peak accurately with a smaller number of sampling data.

Figure 10:
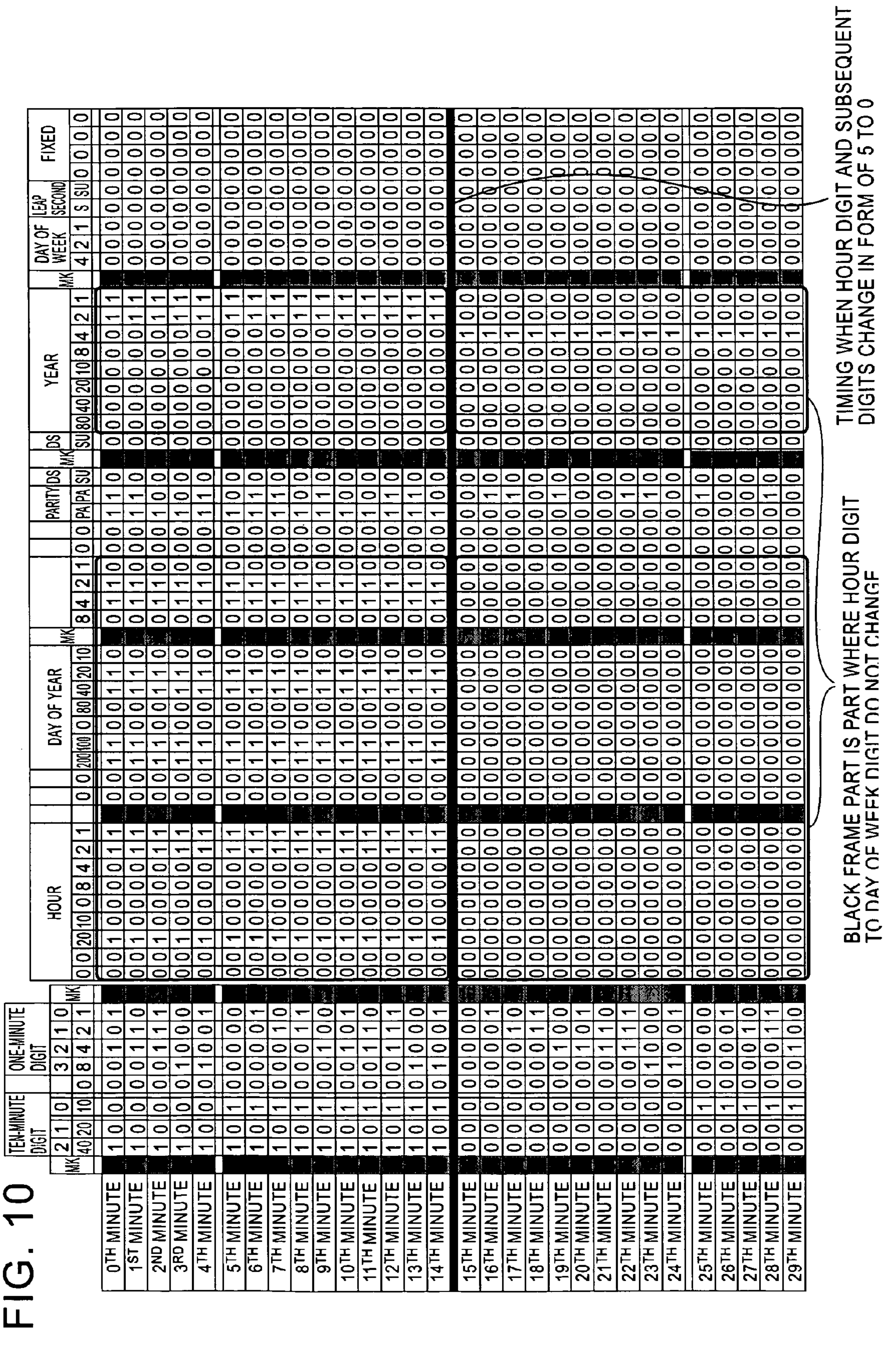
FIG. 10 is a diagram illustrating a decoding method for codes after an hour code in the first embodiment.

FIG. 10 illustrates a decoding method of codes including an hour digit code and subsequent codes in the first embodiment. Here, FIG. 10 illustrates a state in which time data of time, a day of year, and a day of week are decoded with respect to sampling data, in which digit positions have been recognized, on the basis of decoding of time data of the one-minute digit and the ten-minute digit. It has been found that, when it is possible to determine increment timing by a unit of ten minutes as described above, there is no change in time codes concerning an hour digit, a day of year digit, and a day of week digit for ten minutes after such increment. It is possible to decode the hour digit, the day of year digit, and the day of week digit using such a characteristic.

Referring to the figure, time codes for thirty minutes are shown. The increment timing of the ten-minute digit calculated by the method illustrated in FIGS. 9 and 10 is indicated by a bold line. In the periods surrounded by bold lines, although a time code of a pertinent item does not change, taking into account carrying of the hour digit and subsequent digits, the hour digit carries forward only when the ten-minute digit changes from 5 to 0 (from 59 minutes to 00 minute). This means that, although it is likely that the hour digit is carried when the ten-minute digit changes from an odd number to an even number, carrying of the hour digit never occurs when the ten-minute digit changes from an even number to an odd number. Therefore, in the figure, it is seen that a change in time codes is likely to occur only at 14th minutes to 15th minutes. Therefore, considering the sampling data for thirty minutes only, this means that, in the hour digit to the day of week digit data, there is no change in time codes for the maximum thirty minutes either before or after this breakpoint. Thus, it is possible to perform addition for the maximum thirty minutes to improve an SN ratio.

In the first embodiment, time data is decoded by the collective decode system. In the collective decode system, as described above, plural sampling data, which are a sampled value sequence of time code signals, are accumulated over a period of, for example, thirty minutes in which plural frames can be included and statistic processing, which takes into account periodicity of emergence of marker codes and periodicity of emergence of codes corresponding to the one-minute digit to the day of week digit with an identical value, is applied to the sampling data. Consequently, even under an inferior reception environment in which a TCO signal is disturbed or an "H" width of a pulse waveform is changed by noise, it is possible to decode the time code signals precisely.

Note that it is also possible that, by partially using the decoding methods for the one-minute digit code, the ten-minute digit code, and the hour digit to the day of week digit codes as necessary, values of a part of time codes extending over accumulated plural frames are found and, on the basis of the values, only standard time information carried on at least one frame among the plural frames may be reproduced by calculation means such as interpolation.

Figure 11:
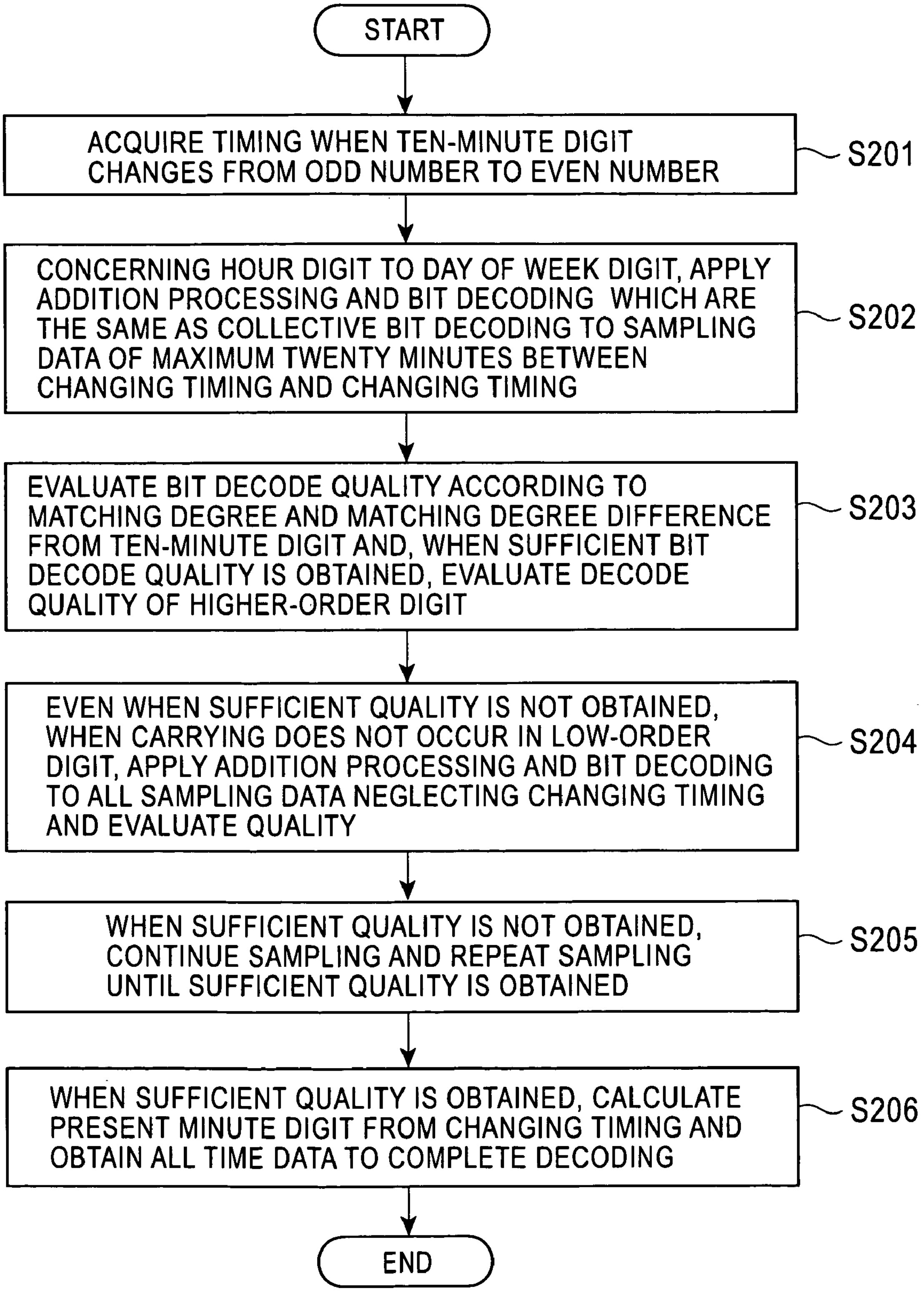
FIG. 11 is a flowchart showing a processing procedure that is executed in a standard wave receiver in a second embodiment of the invention.

FIG. 11 shows a processing procedure that is executed in a standard wave receiver in a second embodiment of the invention. Such a processing procedure is realized by changing a program for the processing procedure in the standard wave receiver in the first embodiment and provides a modification of the processing procedure in the first embodiment. The processing procedure will be explained with reference to the components shown in FIG. 3 according to circumstances. As a premise, it is assumed that sampling data of a TCO signal are accumulated.

Referring to the figure, first, the standard wave receiver acquires timing when a ten-minute digit changes from an odd number to an even number (step S201). Here, the timing when the ten-minute digit changes from an odd number to an even number is acquired by analyzing a least significant bit of the ten-minute digit.

Next, concerning an hour digit to a day of week digit, the standard wave receiver performs convolutional addition processing and bit decoding to sampling data for maximum twenty minutes from one changing timing to the next changing timing collectively (step S202).

Next, the standard wave receiver evaluates a bit decode quality according to a matching degree and a matching difference value from the ten-minute digit. When a sufficient bit decode quality is obtained, the standard wave receiver evaluates a decode quality of a higher order digit (step S203). Subsequently, even if a sufficient quality is not obtained, when carrying does not occur in a low-order digit, the standard wave receiver performs addition processing and bit decoding to all the sampling data, neglecting the changing timing, and performs evaluation of a quality of the bit decode (step S204). If a sufficient quality is not obtained, the standard wave receiver continues sampling and repeats the processing until a sufficient quality is obtained (step S205).

As a result, when a sufficient quality is obtained, the standard wave receiver calculates a present minute digit from the changing timing and obtains all time data to complete the decoding (step S206).

The procedure described above makes it possible to decode a time code of a standard wave. The procedure eliminates error correction processing with respect to an error data, which is necessary in the conventional decode processing, and eliminates a complicated control sequence for coping with an error. Error detection processing or error correction processing becomes unnecessary. As a result, the occurrence of bugs is controlled because a program size is reduced and a sequence is simplified.

In the second embodiment, in addition to the advantages in the first embodiment, re-decode processing corresponding to error decoding is made unnecessary while reduction of a reception time and complicated consistency verification processing are made unnecessary.

Figure 12:
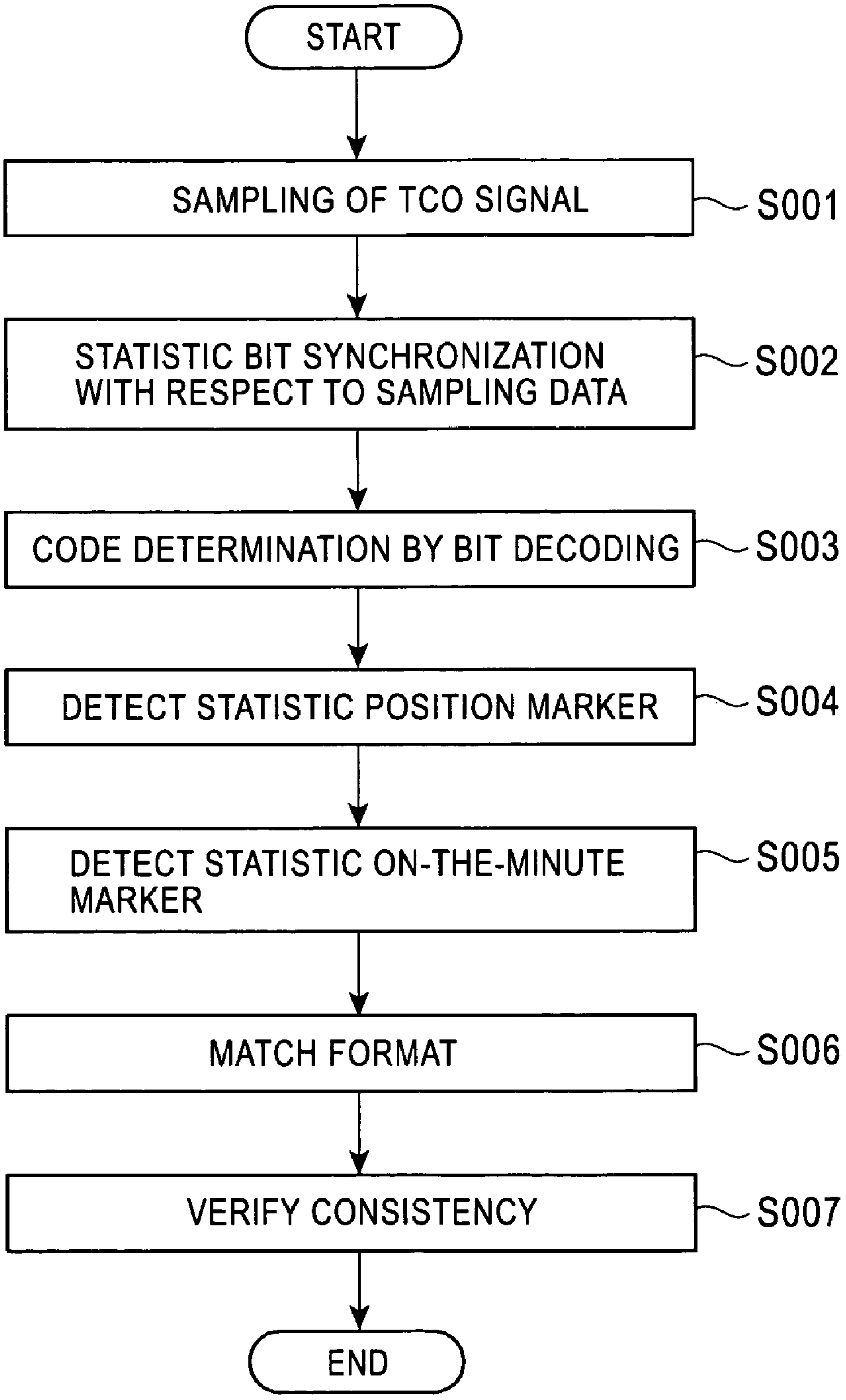
FIG. 12 is a flowchart showing a processing procedure that is executed in a standard wave receiver in a third embodiment of the invention.

FIG. 12 shows a processing procedure that is executed in a standard wave receiver in a third embodiment of the invention. Here, a method of statistic marker position detection and statistic on-the-minute marker position detection, which is one characteristic of the invention, is executed. Such a processing procedure can be realized by changing a program for the processing procedure in the standard wave receiver in the first embodiment. The processing procedure will be explained with reference to the components shown in FIG. 3 according to circumstances.

First, the standard wave receiver 10 samples a waveform of a TCO signal every 50 ms using the sampling circuit 41 (step S001). Subsequently, the standard wave receiver 10 performs statistic bit synchronization for the sampling data under the control of the microprocessor 44 (step S002). Here, as an example, five data are merged into a list in which the data are stacked and the data merged into a list is convolutionally added in a vertical direction to form a graph. Bit synchronization is obtained with a rising edge, which changes uniformly from a minimum to a maximum in the graph, as a synchronization starting point.

Next, the standard wave receiver 10 applies code determination according to bit decoding to the sampling data subjected to the bit synchronization (step S003). Here, bit decoding is performed according to matching processing using template patterns corresponding to a marker code “2”, a binary code “0”, and a binary code “1”, respectively, to distinguish which of the marker code “2”, the binary “0” code, and the binary “1” code the sampling data correspond to. Note that a mask pattern may also be used in order to eliminate sample data with large fluctuation. For example, using a standard deviation in the sampling data as an evaluation standard, the mask pattern is created to mask a sampling data having a standard deviation larger than a predetermined value.

Next, the standard wave receiver 10 applies statistic position marker detection to a distinguished code sequence (step S004). The statistic position marker detection is one characteristic of the invention, details of which will be described later. Subsequently, the standard wave receiver 10 performs statistic on-the-minute marker detection on the basis of a position of a position marker (step S005). Consequently, a frame in the sampling data is recognized.

Next, the standard wave receiver 10 checks the frame with a predetermined format to thereby perform format matching for classifying the sampling data into respective items of time codes (step S006). Here, time data is obtained by extracting the respective items. Subsequently, the standard wave receiver 10 performs consistency verification for verifying contents of the time data (step S007). As the verification of consistency of the time data, processing for checking compatibility with a format, presence of year, month, and day, and the like to regard nonacceptable data as an error is performed. It is possible to reproduce standard time information by merging obtained values of time codes including a minute digit, an hour digit, a day of year digit, and a day of week digit. The standard time information is provided for a function such as display or time setting.

Figure 13:
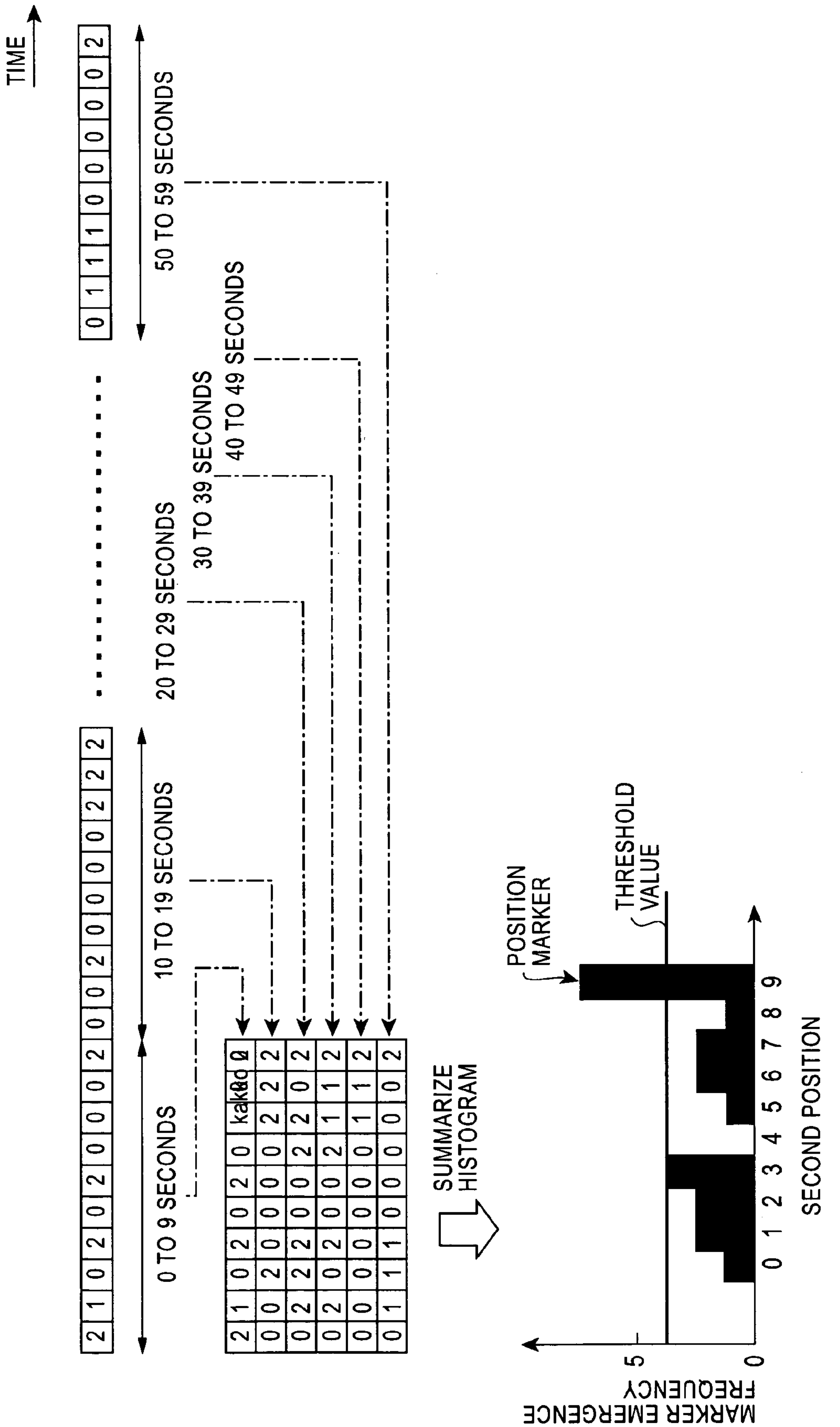
FIG. 13 a diagram illustrating a method of determining a position marker position in the third embodiment.

FIG. 13 illustrates a method of detecting a position marker position in the third embodiment. The detection method is used in step S004 shown in FIG. 12. Here, it is assumed that a code sequence subjected to bit decoding is for a period over sixty seconds.

First, the standard wave receiver 10 divides the code sequence into blocks at a period of ten seconds and merges the blocks into a list. In the example shown in the figure, the code sequence is divided into six blocks, that is, a block of 0 to 9 seconds, a block of 10 to 19 seconds, a block of 20 to 29 seconds, a block of 30 to 39 seconds, a block of 40 to 49 seconds, and a block of 50 to 59 seconds. Subsequently, these six blocks are stacked on horizontal axes for ten seconds corresponding to the listing period of ten seconds to create a list. Next, concerning the list, a histogram for indicating an emergence frequency of a marker code “2” is created with a ten-second period as a horizontal axis.

Referring to the histogram, a distribution of the marker code “2” extends over the ten-second section. Since a position marker is transmitted at a period of ten seconds, in an ideal TCO signal, an emergence frequency should be provided only in a certain second position in ten seconds. However, in an actual TCO signal, wrong detection of the position marker occurs because of irregularities of a waveform due to noise or fluctuation in an H width. As a result, the distribution of the marker code “2” spreads as shown in the histogram. Note that an on-the-minute marker described later is also provided by the marker code “2”. However, since the on-the-minute marker is transmitted only once at a period of sixty seconds, the on-the-minute marker may be neglected in the statistic processing described above.

Next, in order to detect a position marker, the standard wave receiver 10 performs judgment with a threshold value set to “4”. Consequently, it is possible to recognize a position marker in a second position of 9 seconds indicating an emergence frequency of 6. In other words, it is recognized that the position marker is in the positions of second positions 9, 19, 29, 39, 49, and 59 of the code sequence. The system is referred to as a statistic position marker detection system in the invention.

Figure 14:
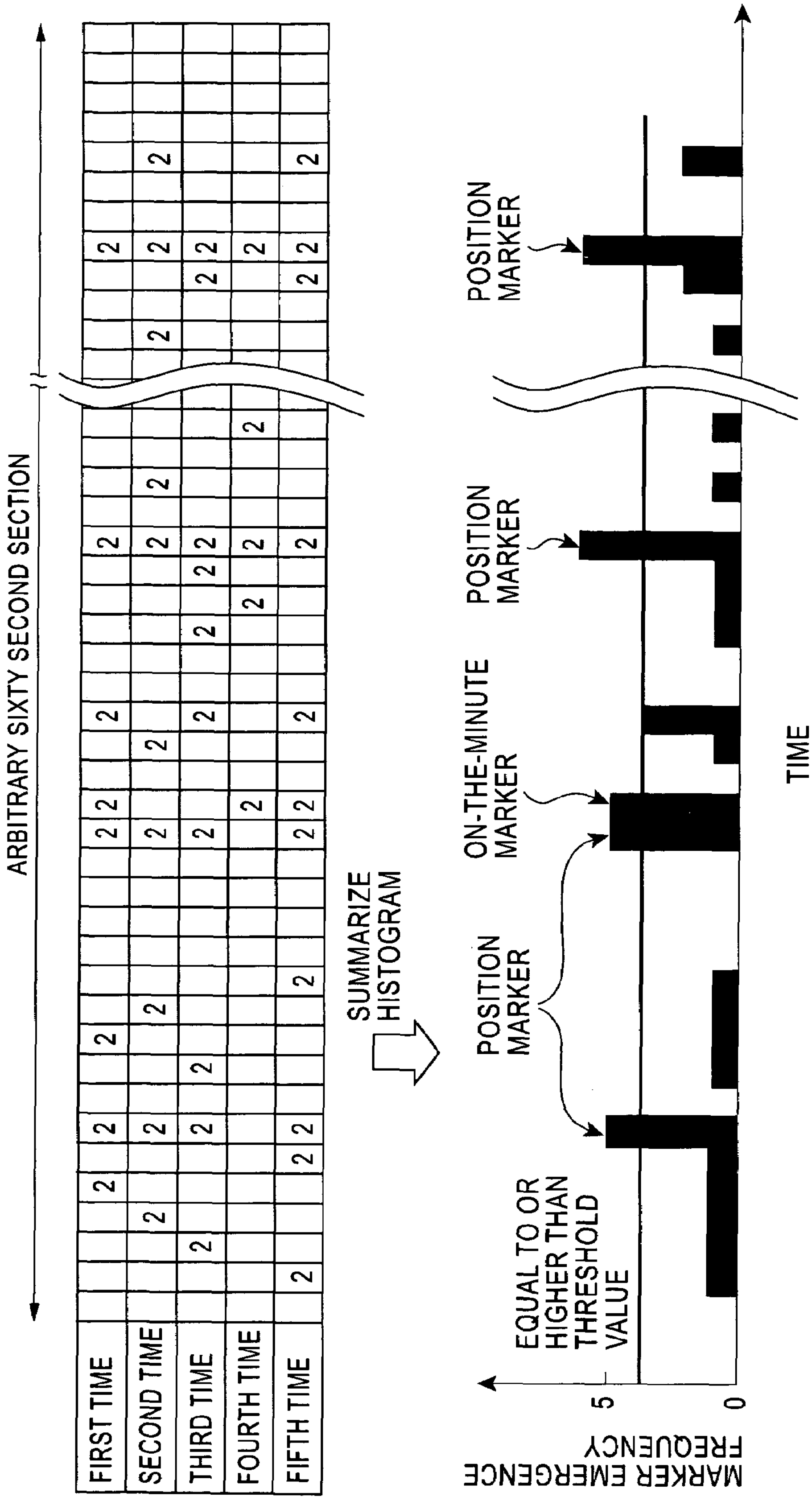
FIG. 14 is a diagram illustrating a method of determining an on-the-minute marker position in the third embodiment.

FIG. 14 illustrates a method of detecting an on-the-minute marker position in the third embodiment. The detection method is used in step S005 shown in FIG. 12. For ease of explanation, only the marker code “2” is shown here. An on-the-minute marker is located at a leading position of a frame in a time code signal and is present once in one minute. Thus, sampling data is subjected to convolutional addition processing in sixty seconds. In the example shown in the figure, sampling data for five minutes, that is, five times are added convolutionally. A histogram of an emergence frequency of the marker code “2” is arranged as a graph. Here, a threshold value is set to 4 and data having the emergence frequency of the marker code “2” equal to or higher than the threshold value is determined as a marker. Since a position of a position marker can be determined according to the method of determining a position of a statistic position marker, it is possible to determine a position of an on-the-minute marker if the position marker is removed.

As described above, in the third embodiment, the statistic marker position determining method is used for determination of positions of a position marker and an on-the-minute marker. Such a method is realized by applying the statistic bit synchronizing method to detection of a marker code. Consequently, even when a waveform of a TCO signal is disturbed by noise and normal decoding is not performed, when data is not decoded normally because an "H" width of a pulse waveform changes, or when a noise state or the "H" width changes in time, it is possible to detect a marker code precisely.

Note that, in the third embodiment, a marker code is detected by performing addition of a listed data group five times. However, the number of times of addition is not limited to such an example. It is possible to further improve detection accuracy of a marker code as the number of addition is increased.

According to the standard wave receiver and the time code decoding method according to the invention, time data is decoded by the collective decode system. In the collective decode system, a plurality of sampling data, which are a sampled value sequence of time code signals, are accumulated over a period of, for example, thirty minutes in which plural frames can be included and statistic processing, which takes into account periodicity of emergence of marker codes and periodicity of emergence of codes corresponding to a one-minute digit to a day of week digit with an identical value, is applied to the sampling data. Consequently, even under an inferior reception environment, it is possible to decode the time code signals precisely.

The standard wave receiver and the time code decoding method according to the invention can be applied not only to a radio controlled watch (clock) that calibrates displayed time on the basis of standard time given by a standard wave but also to various apparatuses having an automatic function based on precise time information such as a television apparatus that performs television recording on the basis of standard time.

I claim:

1. A standard wave receiver for receiving a standard wave including a time code signal, in which one frame including plural time codes is repeated, and decoding the time codes, comprising:

a sampled value sequence accumulating unit that samples the time code signal over a period in which a plurality of the frames continue and accumulates sampled value sequences including plural sampled values generated in time series;

a marker position determining unit that convolutionally adds the sampled value sequences every predicted period of a marker code indicating a leading position of the frame to generate an added value sequence and determines a position of the marker code on the basis of the added value sequence;

a time code position determining unit that determines positions of the respective plural time codes in accordance with the determined position of the marker code; and a time code determining unit that, for each of the time codes, extracts partial sampled value sequences, which corresponds to a position of the time code and is expected to take an identical value, out of the sampled value sequences, convolutionally adds the partial sampled value sequences to generate an added value sequence, and determines a value of the time code on the basis of the added value sequence.

2. A standard wave receiver according to claim 1, wherein the time code determining unit determines values of a one-minute digit code, a ten-minute digit code, an hour digit code, a day of year digit code, a year digit code, and a day of week digit code as the time codes, and the standard wave receiver further includes a unit that decodes time codes of at least one frame of the plural frames on the basis of the values of the time codes partially determined over the plural frames.

3. A time code decoding method of decoding a time code signal, in which one frame including plural time codes is repeated, from a standard wave, comprising:

a sampled value sequence accumulating step of sampling the time code signal over a period in which a plurality of the frames continue and accumulating sampled value sequences including plural sampled values generated in time series;

a marker position determining step of convolutionally adding the sampled value sequences every predicted period of a marker code indicating a leading position of the frame to generate an added value sequence and determines a position of the marker code on the basis of the added value sequence;

a time code position determining step of determining positions of the respective plural time codes in accordance with the determined position of the marker code; and a time code determining step of, for each of the time codes, extracting partial sampled value sequences, which corresponds to a position of the time code and is expected to take an identical value, out of the sampled value sequences, convolutionally adding the partial sampled value sequences to generate an added value sequence, and determining a value of the time code on the basis of the added value sequence.

4. A time code decoding method according to claim 3, wherein the time code determining step is a step of determining values of a one-minute digit code, a ten-minute digit code, an hour digit code, a day of year digit code, a year digit code, and a day of week digit code as the time codes, and the time code decoding method further includes a step of decoding time codes of at least one frame of the plural frames on the basis of the values of the time codes partially determined over the plural frames.

5. A time code decoding method according to claim 3, wherein the time code determining step includes a step of, when the time code is assumed to be a one-minute digit code, extracting partial sampled value sequences every ten minutes from the sampled value sequences.

6. A time code decoding method according to claim 5, wherein the time code determining step includes a step of, when the time code is assumed to be a ten-minute code, extracting partial sampled value sequences for ten minutes, in which it is expected that a value of the ten-minute digit code does not change on the basis of a judged value of the one-minute digit code, from the sampled value sequences.

7. A time code decoding method according to claim 3, wherein the time code determining step includes a step of, when the time code is assumed to be a ten-minute digit code, extracting partial sampled value sequences for ten minutes, in which it is expected that a value of the ten-minute digit code does not change on the basis of a characteristic that a least significant bit of the one-minute digit code changes to 0 or 1 every ten minutes, from the sampled value sequences.

8. A time code decoding method according to claim 6 or 7, wherein the time code determining step includes a step of, when the time code is assumed to be each of an hour digit code, a day of year digit code, a year digit code, and a day of week digit code, extracting partial sampled value sequences, in which it is expected that the each code either before or after a point when a value of the ten-minute digit code changes from 5 to 0 do not change on the basis of a determined value of the ten-minute digit code, from the sampled value sequences.

9. A time code decoding method according to claim 3, wherein when the time code is assumed to be each of an hour digit code, a day of year digit code, a year digit code, and a day of week digit code, the time code determining step extracts partial sampled value sequences from the sampled value sequence, in which it is expected that, on the basis of a characteristic that a value of the ten-minute digit code changes to an odd number or an even number every ten minutes, the codes during the ten minutes do not change.

10. A time code decoding method according to claim 3, wherein each of the marker position determining step and the time code determining step includes:

a correlation calculating step of calculating a correlation value of the added value sequence with each of reference value sequences of the marker code and respective bit which are binary 1 or 0 forming the time codes, every period of the bit codes; and a code determining step of determining values of the respective bit codes forming the added value sequence according to the correlation value.

11. A time code decoding method according to claim 10, wherein the code determining step includes a step of creating at least one of a template pattern and a mask pattern on the basis of the added value sequence, the step being a step of determining values of the respective bit codes using the pattern.

12. A time code decoding method of decoding a time code signal, in which one frame including plural time codes is repeated, from a standard wave, comprising:

a sampling step of sampling the time code signal to generate sampled value sequences including plural sampled values formed in time series;

a bit synchronizing step of convolutionally adding the sampled value sequences at each predetermined time to generate an added value sequence and defining a bit synchronization point of the sampled value sequences on the basis of the added value sequence;

a position marker synchronizing step of convolutionally adding the sampled value sequences every predicted period of emergence of a position marker code to generate an added value sequence and defining a position marker synchronization point of the sampled value sequences on the basis of the bit synchronization point and the added value sequence; and a frame synchronizing step of convolutionally adding the sampled value sequences every predicted period of emergence of a marker code indicating a leading position of the frame to generate an added value sequence and defining a frame synchronization point of the sampled value sequences on the basis of the position marker synchronization point and the added value sequence.

* * * * *